(12) United States Patent
Agopsowicz

(10) Patent No.: US 12,366,841 B2
(45) Date of Patent: Jul. 22, 2025

(54) POST-MEDICAL-PROCEDURE THERAPY DEVICE MANUFACTURED BASED ON MEDICAL IMAGERY AND CUSTOMIZED INFORMATION OF PATIENT AND METHOD OF MANUFACTURING THE SAME

(71) Applicant: Daniel Agopsowicz, Bolivia, NC (US)

(72) Inventor: Daniel Agopsowicz, Bolivia, NC (US)

(*) Notice: Subject to any disclaimer, the term of this patent is extended or adjusted under 35 U.S.C. 154(b) by 918 days.

(21) Appl. No.: 17/064,052

(22) Filed: Oct. 6, 2020

(65) Prior Publication Data

US 2022/0107620 A1    Apr. 7, 2022

(51) Int. Cl.
| | |
|---|---|
| *G05B 19/4099* | (2006.01) |
| *B29C 64/209* | (2017.01) |
| *B29C 64/393* | (2017.01) |
| *B33Y 30/00* | (2015.01) |
| *B33Y 50/02* | (2015.01) |

(Continued)

(52) U.S. Cl.
CPC ........ *G05B 19/4099* (2013.01); *B29C 64/209* (2017.08); *B29C 64/393* (2017.08); *B33Y 30/00* (2014.12); *B33Y 50/02* (2014.12); *B33Y 80/00* (2014.12); *G06F 3/0481* (2013.01); *G06F 3/04842* (2013.01); *G06F 3/0486* (2013.01); *G06F 3/14* (2013.01); *B29L 2031/40* (2013.01); *G05B 2219/49023* (2013.01)

(58) Field of Classification Search
CPC ......... B33Y 80/00; B33Y 50/00; B33Y 30/00; B33Y 50/02; G06F 3/0486; G06F 3/14; G06F 3/147; G06F 3/0481; G06F 3/04842; G06F 3/016; G06F 3/0482; G06F 2203/04806; G06F 1/163; G06F 3/0485; B29C 64/393; B29C 64/386; B29C 64/209; G05B 19/4099; G05B 2219/45166; G05B 2219/49023; G09G 2380/08; B29L 2031/40

See application file for complete search history.

(56) References Cited

U.S. PATENT DOCUMENTS

| | | | |
|---|---|---|---|
| 8,341,139 B1* | 12/2012 | Ogilvie | G06F 40/174 |
| | | | 707/706 |
| 2011/0161056 A1* | 6/2011 | Mueller | B29C 64/165 |
| | | | 382/128 |

(Continued)

FOREIGN PATENT DOCUMENTS

WO    2018069736 A1    4/2018

OTHER PUBLICATIONS

Bartolo, Paulo Jorge, et al., Innovative Developments in Virtual and Physical Prototyping, Proceedings of the 5th International Conference on Advanced Research and Rapid Prototyping, Leiria, Portugal, Sep. 28-Oct. 1, 2011, pp. 51-56.

(Continued)

*Primary Examiner* — Christina A Johnson
*Assistant Examiner* — Kelsey C Grace
(74) *Attorney, Agent, or Firm* — Michael A. Blake

(57) ABSTRACT

A post-medical-procedure therapy device includes a body part replica that is a replica of a body part of a patient that has undergone a medical procedure; and customized information provided on the body part replica, where both the body part replica and the customized information are 3D printed, and where the customized information includes a handwritten message provided to the patient after the medical procedure.

7 Claims, 16 Drawing Sheets

(51) Int. Cl.
*B33Y 80/00* (2015.01)
*G06F 3/0481* (2022.01)
*G06F 3/04842* (2022.01)
*G06F 3/0486* (2013.01)
*G06F 3/14* (2006.01)
*B29L 31/40* (2006.01)

(56) References Cited

U.S. PATENT DOCUMENTS

| | | |
|---|---|---|
| 2017/0090692 A1* | 3/2017 | Kurita .................. G06F 40/166 |
| 2018/0168730 A1 | 6/2018 | Nazy |
| 2018/0350266 A1 | 12/2018 | Calderon |
| 2019/0005200 A1 | 1/2019 | Zimmerman et al. |
| 2019/0019347 A1 | 1/2019 | Auvray et al. |
| 2019/0206134 A1 | 7/2019 | Devam et al. |

OTHER PUBLICATIONS

Tullo, Alex, 3-D Printing takes on the body, C & EN, Nov. 25, 2019, pp. 18-21.

* cited by examiner

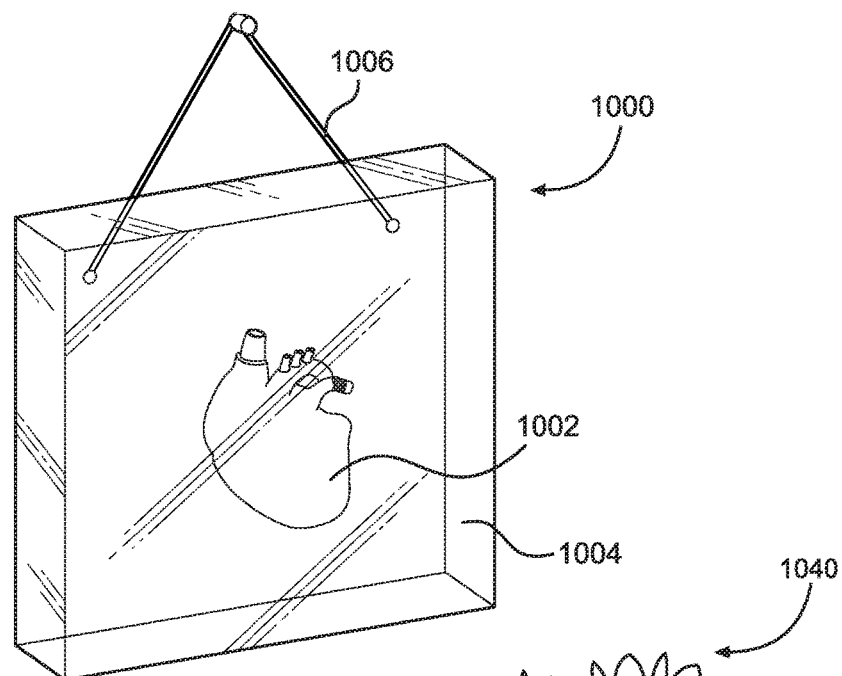
FIG. 10A
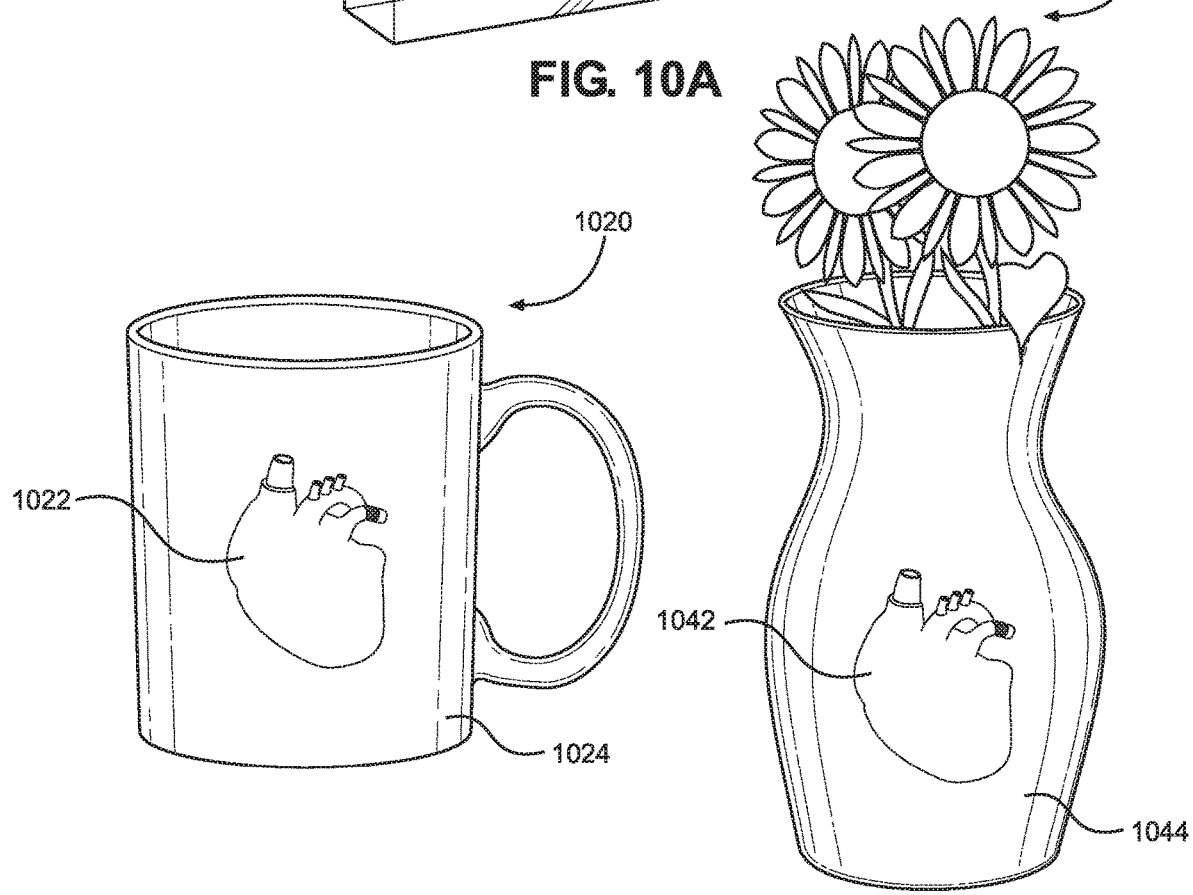
FIG. 10B
FIG. 10C

POST-MEDICAL-PROCEDURE THERAPY DEVICE MANUFACTURED BASED ON MEDICAL IMAGERY AND CUSTOMIZED INFORMATION OF PATIENT AND METHOD OF MANUFACTURING THE SAME

BACKGROUND

1. Field

Exemplary embodiments disclosed herein relate to a therapy device and a method of manufacturing the same, and more particularly, relate to a therapy device that is manufactured based on medical images and customized information of a patient that has undergone a medical procedure, and a method of manufacturing the same.

2. Description of the Related Art

In recent years, there have been significant improvements in medical imaging technology. Researchers and manufacturers have developed safer and more efficient techniques to obtain medical images in each of the major medical imaging technologies, including ultrasound, X-ray, CAT, and magnetic resonance imaging (MRI). Medical professionals rely on these medical imaging techniques to perform a myriad of different types of medical procedures, from diagnosing minor ailments to performing life-saving surgeries.

Quite often, patients who undergo and survive major medical procedures experience significant amounts of post-traumatic stress during the recovery process. This stress is a natural psychological reaction and is unavoidable for many survivors. For example, survivors of open-heart surgery or chemotherapy treatment may feel profound and overwhelming emotions as they recover, which may last for a long time and may have an adverse impact on quality of life.

To cope with this post-traumatic stress, survivors have developed a variety of creative coping mechanisms. For example, some survivors may treat the day on which the medical procedure was performed as a second birthday, or a "Happy Re-birthday", and annually celebrate the day in the same fashion as a traditional birthday party. Other survivors may adopt therapy dogs or other therapy animals to help cope with the trauma. Yet other survivors may hold on to keepsakes from the hospital itself, such as pillows or blankets. Some survivors may also require therapy and medications to cope with post-traumatic stress.

Mental health researchers are actively conducting research to better understand the relationship between medical procedures and post-traumatic stress. Nevertheless, the relationship may not be not fully understood for a long time, and furthermore, it may take many years to develop standardized protocols to help survivors mitigate the harmful psychological effects of post-traumatic stress. In the meantime, there is an urgent need to use new technologies to develop coping mechanisms for survivors.

One of the most exciting and promising new technologies to emerge in recent years is three-dimensional (3D) printing. A 3D printer operates by depositing layers of a material, such as molten plastic, on top of each other to form an object according to digital instructions. 3D printing has several advantages over traditional manufacturing techniques. First, 3D printing can automatically manufacture very complex prototypes in an efficient fashion using digital instructions, whereas traditionally, a person would need to create such prototypes by hand, which would require significantly more time and effort. Second, 3D printing is an "additive" manufacturing technique that only adds layers of material together into empty space to make a finished product, whereas most conventional manufacturing techniques are "subtractive" manufacturing techniques that extract a finished product from a larger amount of material, thus leaving the remaining material as waste. Third, 3D printers come in a wide range of types, sizes, and price points and thus can be used by individuals or larger companies to mass produce an incredibly diverse range of products, whereas traditional mass production techniques are only accessible for large companies.

Many industries rely on 3D printing to manufacture products. For example, airline manufacturers use 3D printing to manufacture airplane parts, schools use 3D printing to manufacture visual aids for educational purposes, and electronics companies use 3D printing to manufacture prototypes of products. The medical industry uses 3D printing to manufacture prosthetics, hearing aids, dental aligners, night guards, X-ray phantoms, and other devices.

The related art discloses several different types of 3D printing for medical applications.

WO 2018/069736 A1 to Haslem discloses a technique of generating a 3D physical model of a patient specific anatomic feature from 2D medical images. To achieve this, 2D medical images are uploaded by an end-user via a Web Application and sent to a server; the server processes the 2D medical images and automatically generates a 3D printable model of a patient specific anatomic feature; and the 3D printable model is 3D printed as a 3D physical model.

US 2018/0350266 to Calderon discloses a method for producing anatomical models of human organs, in particular, soft organs, such as liver or breast models, which have utility in teaching and different disciplines of the medical sector. In the first stage, information about the patient's liver is obtained by an image diagnosis. In the second stage, a three-dimensional computerized model of the entire organ is obtained. In the third stage, a negative mold (1) of the liver is designed, with a computer-aided design (CAD) program and a 3D printer. In the fourth stage, the negative mold (1) is closed and a soft material such as silicone is injected into the mold to form the anatomical model.

US 2018/0168730 A1 to Nazy discloses a technique of acquiring two-dimensional or three-dimensional computer images of a patient-specific body part, using a computer to generate an interactive three-dimensional computer model based off of the acquired computer images, generating a physical three-dimensional model using a 3-D printer 16 based off of the computer model, and incorporating one or more indicators into the physical three-dimensional model. The indicators can be visual indications, audio indicators, vibratory indicators, radioactive indicators (for targeting of radiation therapy), etc. The physical three-dimensional model can then be sliced, irradiated, or otherwise interacted with to simulate a procedure, and the indicators can provide feedback.

As described above, the 3D printing techniques disclosed by the related art are only directed towards using 3D printed models to assist medical professionals with performing medical procedures. However, none of the related art techniques are directed towards 3D printing an object that can be used by the patient for therapeutic reasons during the recovery process.

SUMMARY

Exemplary embodiments disclosed herein relate to a novel 3D printed object that functions as a therapy device for survivors of medical procedures and is fabricated based on both medical images and customized information particular to the survivors, and a novel method of manufacturing the same.

Exemplary embodiments disclosed herein further relate to a novel 3D printer to fabricate the therapy device.

Exemplary embodiments disclosed herein further relate to a novel application that controls an electronic device and/or a 3D printer to perform functions to 3D print a post-medical-procedure therapy device.

According to an aspect of an exemplary embodiment, there is provided a post-medical-procedure therapy device, including: a body part replica that is a replica of a body part of a patient that has undergone a medical procedure; and customized information provided on the body part replica, wherein both the body part replica and the customized information are 3D printed, and wherein the customized information comprises a handwritten message provided to the patient after the medical procedure.

The post-medical-procedure therapy device may further include: a base to support the body part replica, wherein additional customized information is provided on the base.

The body part replica may be 3D printed based on a medical image of the body part of the patient.

The customized information may be 3D printed based on at least one handwritten message to the patient which is input to an electronic device of the patient.

The customized information and the body part replica may be 3D printed from a same material such that the customized information and the body part replica are integrally formed.

The post-medical-procedure therapy device may be 3D printed as one of a stuffed animal, a pillow, jewelry, a watch, dog tags, artwork, a coffee mug, a vase, sporting equipment, an edible product, or a law enforcement object.

According to an aspect of another exemplary embodiment, there is provided a 3D printer, including: 3D printer hardware configured to print a 3D object, the 3D printer hardware comprising: a print head configured to heat filament and extrude the heated filament; and a print bed upon which the extruded filament is configured to be deposited on a layer-by-layer basis to thereby print the 3D object; and an application stored in the 3D printer hardware, the application configured to: receive a finalized design of a post-medical-procedure therapy device, the finalized design including information indicating a body part replica to be 3D printed based on a medical image and customized information added to the body part replica, and control the 3D printer hardware to 3D print the post-medical procedure therapy device based on the finalized design.

The print head may include: a motor assembly configured to push the filament through the print head, a heater assembly configured to receive the filament from the motor assembly and heat the filament, and a nozzle configured to eject the heated filament from the print head onto the print bed; and the 3D printer hardware may further include a movable member configured to move the print head according to the control of the application to thereby print the post-medical procedure therapy device.

The customized information may include at least one handwritten message, and the application may be configured to control the 3D printer hardware to 3D print the customized information on a surface of the body part replica according to the finalized design.

The finalized design may further include information indicating a type of object to be 3D printed in combination with the body part replica, the type of object being one of a stuffed animal, a pillow, jewelry, a watch, dog tags, artwork, a coffee mug, a vase, sporting equipment, an edible product, or a law enforcement object.

The 3D printer may be configured to 3D print the object and the body part replica together as one integral unit according to the finalized design.

The 3D printer may be configured to 3D print the object and the body part replica separately according to the finalized design.

According to an aspect of another exemplary embodiment, there is provided a non-transitory computer readable medium having stored thereon an application which, when executed, causes a processor housed within an electronic device to execute the operations of: accessing a medical image stored in a memory of the electronic device; generating and displaying, on a screen of the electronic device, an initial design of a post-medical-procedure therapy device to be 3D printed by a 3D printer based on the medical image; receiving, on the screen of the electronic device, user input adding customized information to the initial design; generating and displaying a finalized design of the post-medical-procedure therapy device based on the user input; and transmitting the finalized design to the 3D printer and controlling the 3D printer to 3D print the post-medical-procedure therapy device based on the finalized design.

The operation of generating and displaying, on the screen of the electronic device, the initial design of the post-medical-procedure therapy device to be 3D printed may include: determining whether instructions for preview images are present; and generating preview images based on the determining.

The preview images may be images of different types of objects to be 3D printed based on the stored medical image.

The generating of the preview images based on the determining may include: in response to the determining indicating that instructions to generate the preview images are present: generating the preview images; receiving user input selecting one of the preview images; and setting the selected preview image as the initial design; and in response to the determining indicating that instructions to generate the preview images are not present: setting a default type of object as the initial design.

The receiving, on the screen of the electronic device, the user input adding the customized information to the initial design may include: displaying, on the screen, different portions of customized information stored in the memory of the electronic device; receiving user input selecting and moving one of the portions of the customized information to a location on the initial design; and generating and displaying, on the screen, the finalized design based on the received user input.

The receiving, on the screen of the electronic device, the user input adding the customized information to the initial design may further include: receiving user input selecting and moving another of the portions of the customized information to another location on the initial design; and generating and displaying, on the screen, the finalized design based on the received user input.

The application, when executed, may further cause the processor to execute the operation of: receiving the different portions of the customized information by receiving user input on the screen of the electronic device from customized information providers, and storing the received different portions in the memory.

The receiving of the user input selecting and moving one of the portions of the customized information may include using a point-click-drag operation to move the selected portion to the location on the initial design.

Additional aspects will be set forth in part in the description which follows and, in part, will be apparent from the description, or may be learned by practice of the presented exemplary embodiments.

BRIEF DESCRIPTION OF THE DRAWINGS

These and/or other aspects will become apparent and more readily appreciated from the following description of the exemplary embodiments, taken in conjunction with the accompanying drawings in which:

FIGS. 10A, 10B, and 10C illustrate post-medical procedure therapy devices according to still other exemplary embodiments;

DETAILED DESCRIPTION

Figure 1:
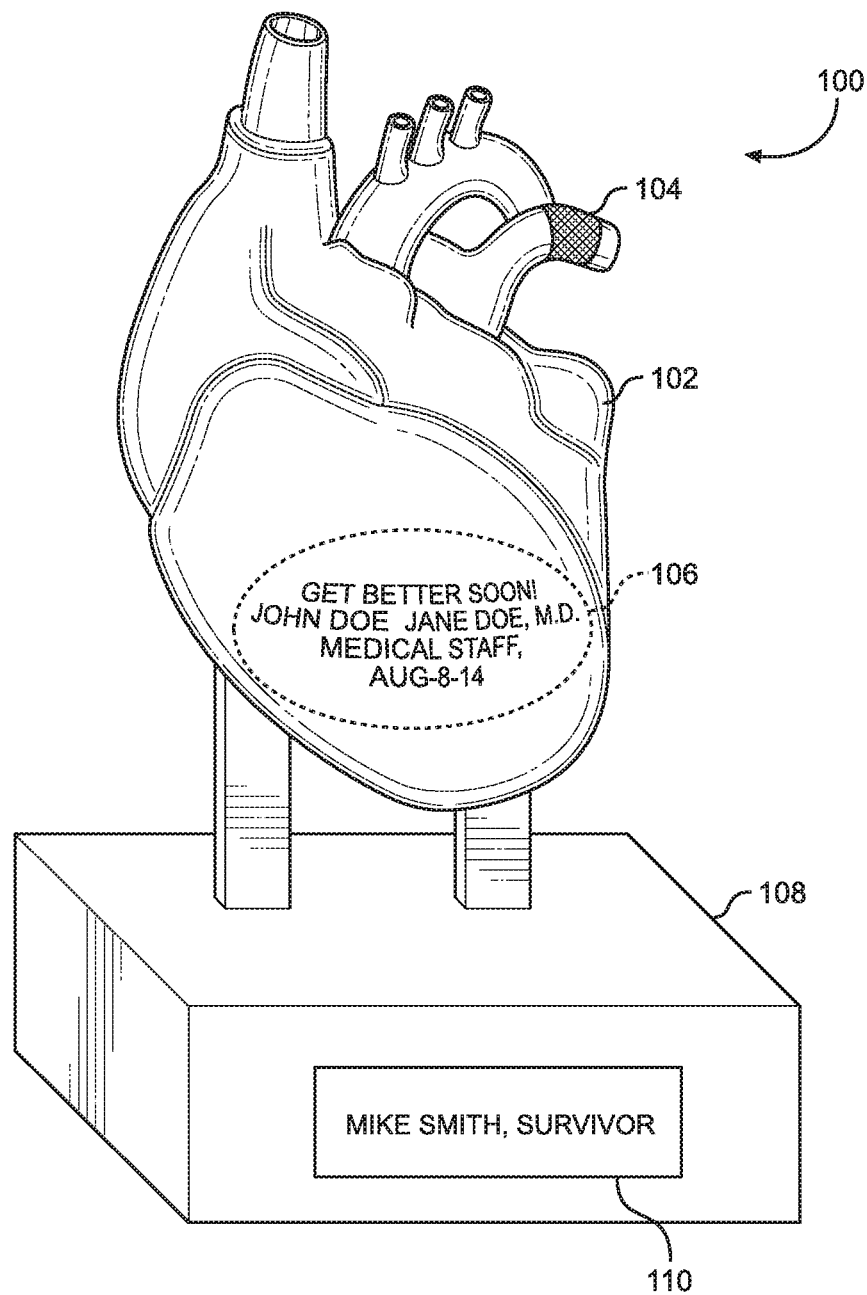
FIG. 1 illustrates a post-medical procedure therapy device according to an exemplary embodiment.

Hereinafter, a post-medical procedure therapy device that functions as a therapy device for survivors of medical procedures, along with methods and systems configured to manufacture the same, will be described with reference to the accompanying drawings.

In the instant specification, the term "medical procedure" can refer to any type of procedure that is intended to diagnose, manage, and/or cure a health defect of a patient. According to exemplary embodiments, medical procedures can be surgical procedures that vary from minor surgical procedures, such as outpatient procedures, to major surgical procedures, such as open-heart surgeries, treating gunshot wounds, broken bones, car crashes, etc. According to exemplary embodiments, medical procedures can also be non-surgical procedures, such as cancer treatments (e.g., chemotherapy, radiation), procedures to assist patients suffering from respiratory distress (e.g., using ventilators for COVID-19 patients or flu patients), procedures to manage pain and suffering (e.g., skin grafts for burn victims), and many other types of non-surgical procedures. Typically, such medical procedures are performed by trained medical personnel in an appropriate environment such as a hospital or doctor's office, although exemplary embodiments are not limited to such. The term "medical procedure" according to exemplary embodiments is not limited to any particular type of medical procedure, and is intended to cover all of the different areas of medicine, including all forms of surgery, obstetrics and gynecology, pediatrics, cardiology, neurology, allergy and immunology, anesthesiology, dermatology, radiology, family medicine, medical genetics, nuclear medicine, ophthalmology, rehab, psychiatry, and others.

In the instant specification, the term "3D printing" refers to an additive manufacturing technique by which three-dimensional ("3D") objects are fabricated by depositing layers of a material on top of each other according to digital instructions. According to exemplary embodiments, 3D printing can be performed using many different types of material to form the 3D object, including plastic materials such as acrylonitrile butadiene styrene (ABS), polylactic acid (PLA), acrylonitrile styrene acrylate (ASA), polyethylene terephthalate (PET), polycarbonate (PC), high performance polymers (HPP), carbon fiber, hybrid materials, soluble materials (e.g., high impact polystyrene (HIPS)), silicone, and others. Additionally, according to exemplary embodiments, 3D printing can also be performed using various types of metals, such as aluminum, steel, brass, copper, bronze, gold, silver, platinum, titanium, nickel, various types of alloys, and others. Moreover, according to exemplary embodiments, 3D printing can be also be performed using sand, wood, nylon, glass, edible material, various types of fabrics, and many other materials. 3D printing according to exemplary embodiments is not limited to using any particular type of filament material and is not limited to using any particular type of 3D printer.

FIG. 1 illustrates a post-medical procedure therapy device according to an exemplary embodiment. As shown in FIG. 1, the post-medical procedure therapy device 100 includes a 3D printed object 102 including a procedure focus area 104 and customized information 106, and a base 108 including additional customized information 110. The post-medical procedure therapy device shown in FIG. 1 is a mounted replica type.

The 3D printed object 102 (also referred to as a "body part replica") is a 3-D printed replica of a patient's body part. In the example shown in FIG. 1, the 3D printed object 102 is a 3-D printed replica of a patient's heart after undergoing a procedure to repair the patient's pulmonary artery. The 3D printed object 102 can be made of many different types of materials, such as plastic, metal, glass, silicone, or any other material or combination of materials that can be 3D printed. To accurately fabricate the 3D printed object 102, a 3D printer uses medical images of the patient's heart taken before or after the surgical procedure is performed. The 3D printed object 102 may be opaque, translucent, or transparent. The 3D printed object 102 may also have additional decorations added therein, such as various color patterns or designs.

The procedure focus area 104 is an area of the 3D printed object 102 which corresponds to a portion of the patient's body part on which the successful medical procedure has been performed. In the example shown in FIG. 1, the procedure focus area 104 corresponds to the pulmonary artery which has been grafted. To accurately fabricate the procedure focus area 104, a 3D printer may use medical images of the patient's heart taken before and after the surgical procedure is performed. The procedure focus area 104 may be omitted. For example, if the medical procedure does not involve a surgical repair of a patient's body part, then the procedure focus area 104 may be omitted.

The customized information 106 is information that specifically relates to certain details of the patient's procedure and may have sentimental value to the patient. In this way, the customized information 106 is useful to help the patient cope with post-traumatic stress from the medical procedure. For example, as shown in the exemplary embodiment of FIG. 1, the customized information 106 may be personal Get-Well messages written to the patient from various people, such as friends, family members, or the medical staff. Alternatively, the customized information 106 may be signatures, drawings, photographs, or any other information that the patient wants to add to the post-medical procedure therapy device 100.

The base 108 supports the 3D printed object 102. According to an exemplary embodiment, the base 108 may be formed of various types of material, such as wood, plastic, glass, etc. As shown in the example of FIG. 1, the base 108 may have a cuboid shape, although the base 108 is not limited to such, and may be manufactured to have many other shapes as well, including cubic, triangular, torus, conical, spherical, partially curved shapes such as a cuboid with rounded corners, or any other shape desired by the patient. Typically, the base 108 will have sufficient mass to steadily support the 3D printed object 102 in an upright position. The base 108 may also have additional features, such as adhesive or fasteners on the bottom surface thereof to mount the base 108 to a surface such as a table. The base 108 may be integrally connected to the 3D printed object 102 or may be detachably connected to the 3D printed object 102. Similar to the 3D printed object 102, the base 108 may be opaque, translucent, or transparent, and may have many different designs therein.

The base 108 may include additional customized information 110. For example, as shown in FIG. 1, the customized information 110 may be a nameplate with the name of the patient provided thereon and the title of "survivor" following the patient's name, e.g., "Mike Smith, survivor". Alternatively, the customized information 110 may include many other types of information, such as the patient name and date of the procedure, the name of the hospital at which the procedure was performed, personalized quotes, drawings, photographs, or any other kind of information desired by the patient. In some exemplary embodiments, the customized information 110 and/or the base 108 may be omitted. Also, although FIG. 1 shows two different types of customized information 106 and 110, it is understood by those skilled in the art that more than two types of customized information may be added to the post-medical procedure therapy device 100.

Figure 2A:
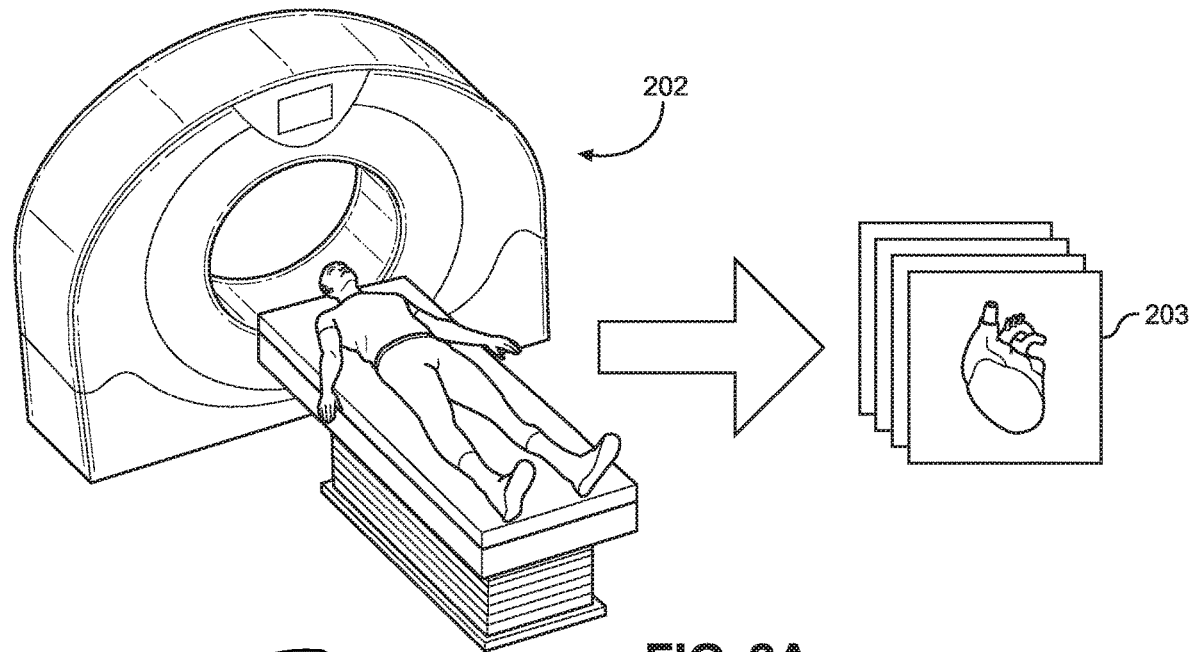
FIGS. 2A, 2B, and 2C illustrate various types of medical imaging apparatuses and medical information used to fabricate a post-medical procedure therapy device according to an exemplary embodiment.
Figure 2B:
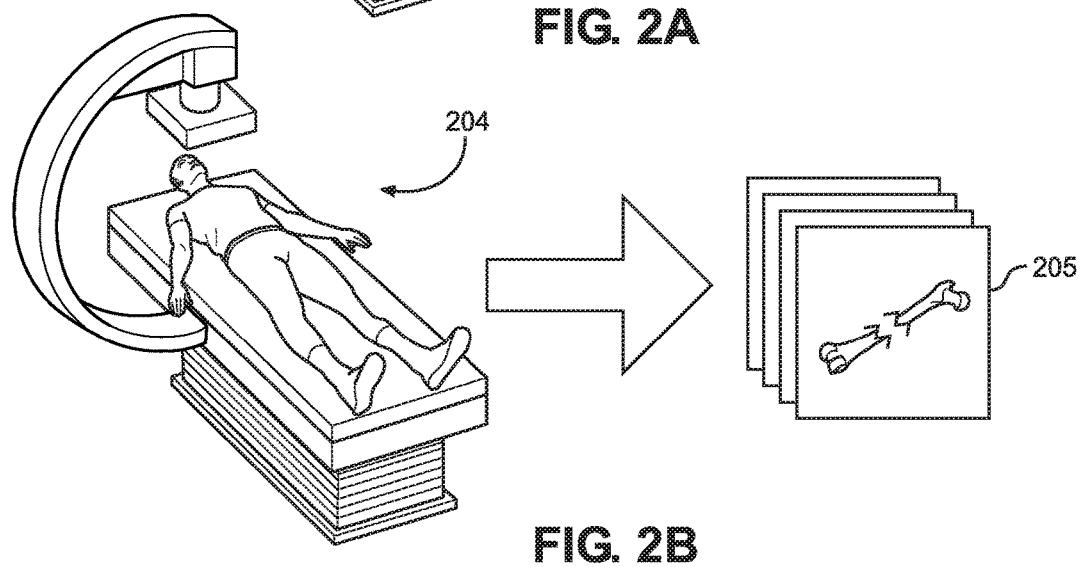
Figure 2C:
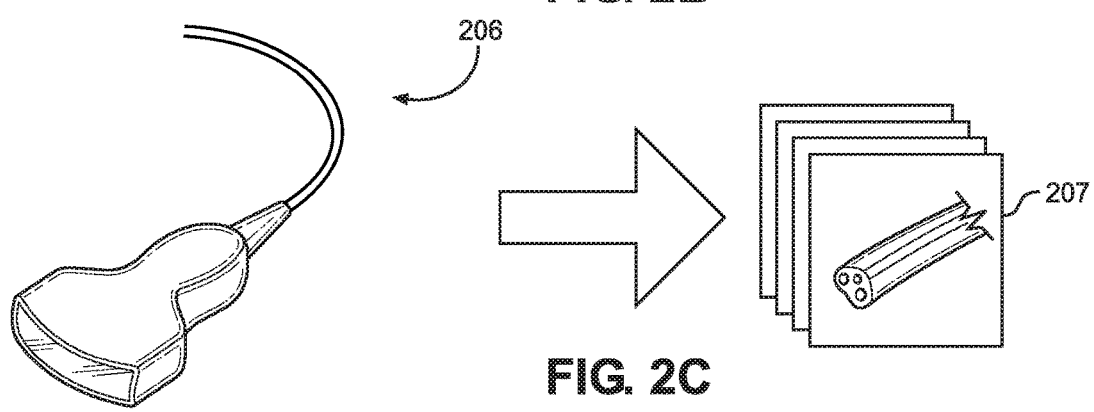

FIGS. 2A, 2B, and 2C illustrate various types of medical imaging apparatuses and medical information used to fabricate a post-medical procedure therapy device according to an exemplary embodiment. As shown in FIG. 2A, a magnetic resonance imaging (MRI) apparatus 202 can be used to generate MRI medical images 203, such as, for example, a detailed high contrast image of an organ. As shown in FIG. 2B, an X-ray apparatus 204 can be used to generate X-ray medical images 205, such as, for example, a detailed image of a broken bone. As shown in FIG. 2C, an ultrasound apparatus 206 can be used to generate ultrasound medical images 207, such as, for example, blood vessels or muscles. The various types of medical images 203, 205, and 207 may also be collectively referred to as "medical images". It is understood, of course, that exemplary embodiments are not limited to using the medical images generated by the medical imaging techniques shown in FIG. 2, and that many different types and combinations of medical imaging techniques (including CAT scans) can be used to generate the medical images.

Figure 3A:
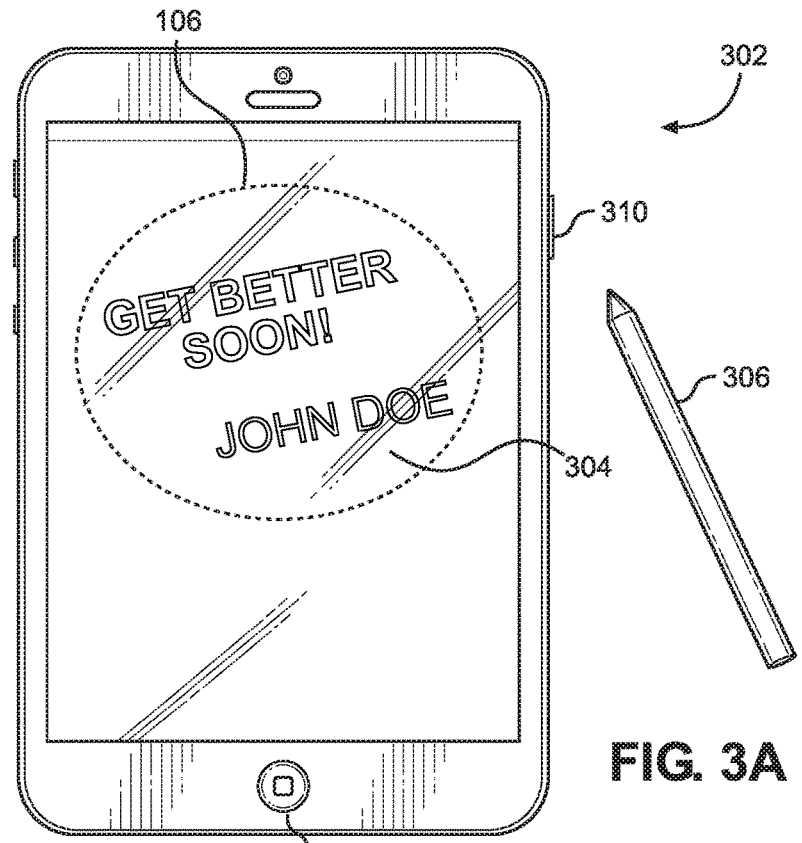
FIGS. 3A and 3B illustrate a front external view and an internal view of an electronic device configured to obtain customized information that is used to fabricate a post-medical procedure therapy device according to an exemplary embodiment.
Figure 3B:
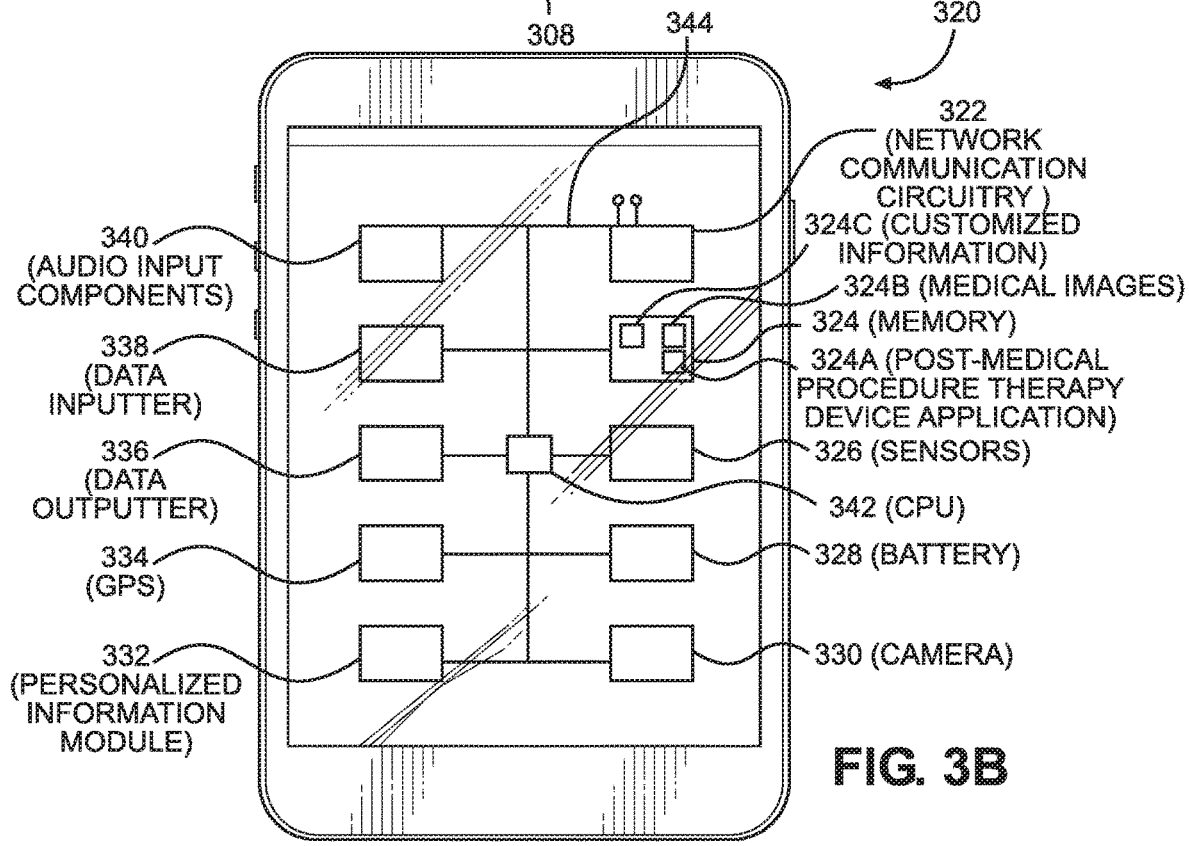

FIGS. 3A and 3B respectively illustrate a front external view and an internal view of an electronic device configured to obtain customized information that is used to fabricate a post-medical procedure therapy device according to an exemplary embodiment. As shown in FIG. 3A, which is a front view of the external housing of the electronic device 302, the electronic device 302 is a device configured to receive customized information from various users, process the received information, and transmit the processed information to another entity that can then apply the processed information to the post-medical procedure therapy device 100. Although FIG. 3A exemplarily illustrates the electronic device 302 as a smartphone, the electronic device 302 can also be a tablet, a laptop computer, wearable electronic gear (e.g., a smart watch), a desktop computer, or any other kind of electronic device. As shown in FIG. 3A, the electronic device 302 includes a touch screen 304 configured to receive touch input, a stylus 306 that can be used to write on the touch screen 304, a home button 308 to navigate a user back to a home screen, and a side button 310 used to power the electronic device 302 on and off. By using the stylus 306, a user, such as a medical staff member, can provide customized information 106 such as a get-well message to a patient while the patient recovers from a medical procedure. According to certain exemplary embodiments, the stylus 306 may be omitted and the touch screen 304 may receive user input from other input devices, such as a user's finger, etc. Also, exemplary embodiments are not limited to the customized information 106 being provided in the form of written messages, and instead the customized information 106 may be provided in other forms. For example, a medical staff member can speak a get-well message into a microphone of the electronic device 302, and the message can then be converted into a visual representation of the message (e.g., converted into a written message), or can be stored as an audio recording for future listening. A similar approach can be taken with video messages. Alternatively, the electronic device 302 can be used to take a photograph of the medical staff, friends, or family members after the medical procedure, and the photograph can be stored as the customized information. Moreover, the electronic device 320 can be used to take a photograph of hand-written customized information, for example, a message written to the patient on a Get-Well card, and then can be converted to digital customized information. Additionally, the customized information can be periodically updated from time to time, as desired by the patient. For example, if the patient wishes to 3D print multiple therapy devices over time, the patient may wish to update or modify the customized information each time. Also, each of the different types of customized information can be combined with each other.

As shown in FIG. 3B, which is an internal view of the circuitry of the electronic device 302, the electronic device 302 includes many different electronic components configured to interoperate with each other and thereby perform various functions. Specifically, the electronic device 302 includes network communication circuitry 322, a memory 324 that stores a post-medical procedure therapy device application 324A, medical images 324B, and customized information 324C, sensors 326, a battery 328, a camera 330, a personalized information module 332, a global positioning system (GPS) 334, a data outputter 336, a data inputter 338, audio components 340, a central processing unit (CPU) 342, and a bus 344 connecting the electronic components together.

The network communication circuitry 322 includes components configured to enable communication between the electronic device 302 and other electronic devices over a network or plurality of networks. The network communication circuitry 332 can include, for example, a 4G telecommunications module, a Wi-Fi telecommunications module, or a combination of different modules.

The memory 324 stores programs and user data therein. The memory 324 can be, for example, various types of RAM and ROM memory units, flash memories, and other types of memory units. According to an exemplary embodiment, the memory 324 stores a post-medical procedure therapy device application 324A, medical images 324B, and customized information 324C. The post-medical procedure therapy device application 324A is an application that, when executed, causes the electronic device 302 to perform a method of 3D printing the post-medical procedure therapy device using the stored medical images 324B and customized information 324C. The post-medical procedure therapy device application 324A can be implemented as many different types of applications, such as software, firmware, etc., and can be created and edited using many different types of languages, such as Python, Java, Javascript, C++, Ruby, etc. The stored medical images 324B include one or a plurality of medical images of a patient and can be many different types, such as the MRI medical images 203, the X-ray medical images 205, and the ultrasound medical images 207. The customized information 324C includes one or a plurality of pieces of customized information, such as the customized information 106 and the additional customized information 110.

The sensors 326 can include various types of sensors, such as motion sensors, touchsceen sensors, accelerometers, proximity sensors, barcode scanners, fingerprint scanners, and other types of sensors.

The battery 328 stores electrical power therein and can be various types, such as nickel-cadmium (NiCd), NiMH, Lithium-ion, etc. Different types of electronic devices 302 will require different types of batteries, and exemplary embodiments are not limited to any particular type of battery.

The camera 320 captures still images and videos.

The personalized information module 332 is a module that stores personalized information for a user, such as contact information of friends and family. Typically, the personalized information module 332 is detachable and can be inserted into another electronic device. For example, when the electronic device 302 is a smartphone, the personalized information module 332 can be a SIM card or similar device.

The GPS 334 is a component that determines a position of the electronic device 302. According to an exemplary embodiment, the GPS 334 receives a GPS signal, calculates a position of the electronic device using various types of positioning techniques, such as data logging, data pushing, or data pulling, and outputs the position to a user.

The data outputter 336 is a module that outputs data to a user. The data outputter 336 can output the data in various forms, such as visual, audio, haptic, etc. For example, the data outputter 336 can be the touch screen 304 that outputs visual data, a speaker that outputs audio data, a vibration mechanism that outputs haptic feedback, or a combination thereof.

The data inputter 338 is a module that receives user data. The data inputter 338 can receive the input data in various forms, such as touch data or audio data. For example, the data inputter 338 can be the touch screen 304 that receives touch data. In this sense, the touch screen 304 can be considered as both a data output and a data input component.

The audio input components 340 include components that receive audio data input to the electronic device 302. For example, the audio input components can include a microphone, a headset jack, etc.

The central processing unit (CPU) 342 controls the overall functionality of the electronic device 302. To achieve this, the CPU 342 accesses programs and other data stored in the memory 324 and executes desired functionalities based on the program and other data.

The bus 344 is electrical wiring that connects each of the other components together.

It is understood that many other types of components can also be included instead of or in addition to those shown in FIG. 3.

Figure 4:
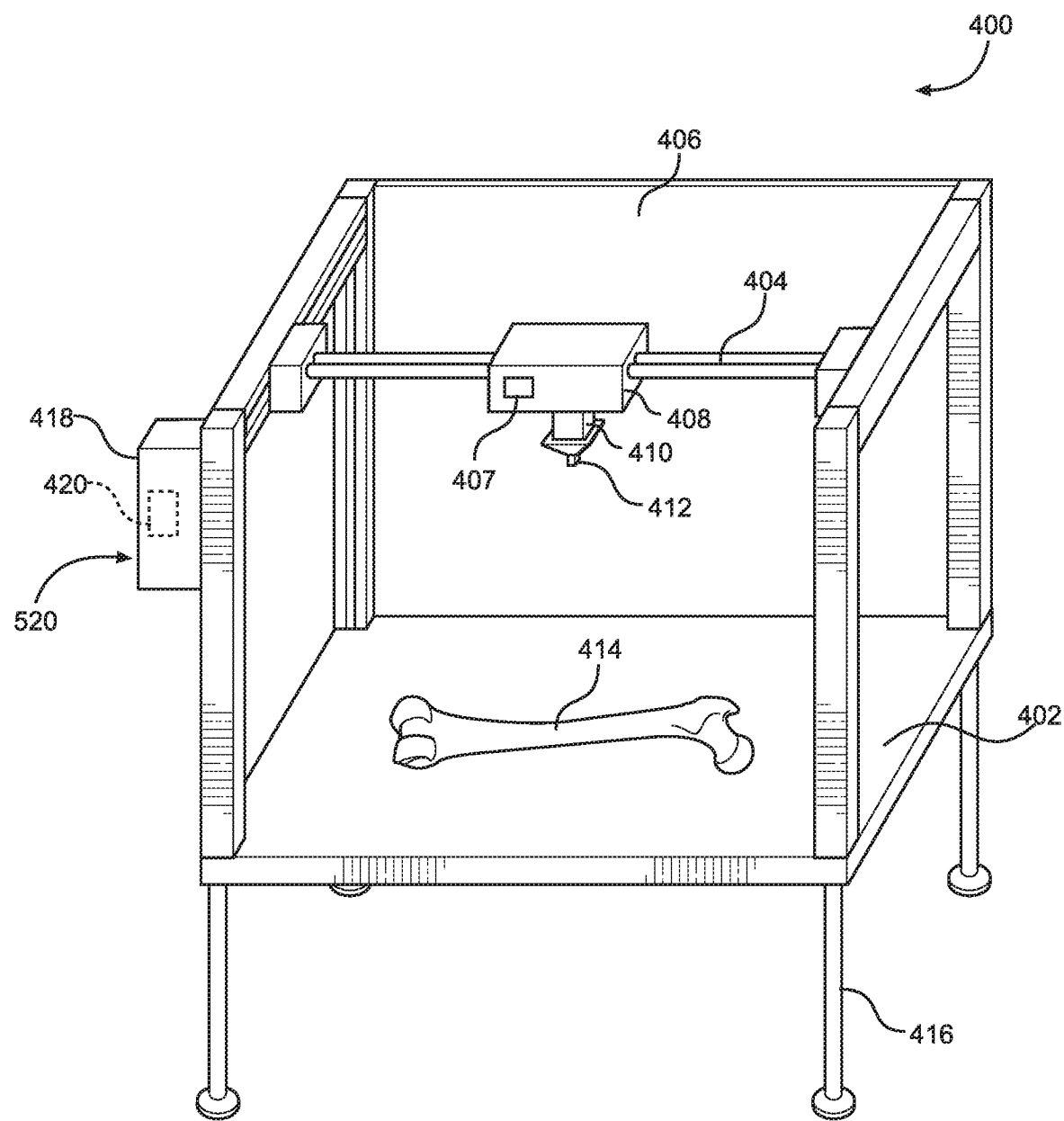
FIG. 4 illustrates 3D printer hardware according to an exemplary embodiment.

FIG. 4 illustrates 3D printer hardware according to an exemplary embodiment. As shown in FIG. 4, the 3D printer hardware 400 includes a print bed 402, a movable member 404, a print head 406 including a motor assembly 408, a heater assembly 410, a nozzle 412, and legs 416. In the example shown in FIG. 4, the 3D printer hardware 400 is 3D printing a body part replica of a patient's bone after the patient has undergone a medical procedure relating to the bone.

The print bed 402 is a surface upon which heated filament extruded from the print head 406 is deposited, to thereby form the 3D printed object 414. The print bed 402 is typically flat and includes an adhesive surface for the extruded filament to temporarily bond to. The print bed 402 can be made of many different materials, such as glass, steel, magnetic materials, polypropylene, and other materials.

The movable member 404 is a structure that moves the print head 406 in various directions according to digital instructions, to precisely control where the heated filament is extruded. In the example shown in FIG. 4, the movable member 404 includes a rod that moves the print head 406 in the X-Y plane according to digital instructions. Of course, it is understood that the movable member 404 shown in FIG. 4 is an example only, and that many different types of structures other than the structure shown in FIG. 4 may be used to move the print head 406. For example, movable members may include various combinations of belts, stepper motors, threaded rods, servos, and other components to move the print head 406 in any direction, including left-right, up-down, various angles, etc.

The print head 406 is the component that houses, melts, and extrudes filament 407 to form the printed object 414. To achieve this, the print head 406 (which may also be referred to an extruder) includes a motor assembly 408, a heater assembly 410, and a nozzle 412. The filament 407 is stored in or otherwise fed into the print head 406 and can be many different types of materials, such as acrylonitrile butadiene styrene (ABS), polylactic acid (PLA), acrylonitrile styrene acrylate (ASA), polyethylene terephthalate (PET), polycarbonate (PC), high performance polymers (HPP), carbon fiber, hybrid materials, soluble materials (e.g., high impact polystyrene (HIPS)), silicone, aluminum, steel, brass, copper, bronze, gold, silver, platinum, titanium, nickel, various types of alloys, sand, wood, nylon, glass, edible material, various types of fabrics, or other materials. The motor assembly 408 pushes the filament 407 towards the heater assembly 410 and includes a motor, such as a stepper motor, along with a combination of components such as gears, springs, tubing, or other parts that can be used to guide the filament 407. The heater assembly 408 heats the filament 407 to thereby melt the filament 407 and can include many different type of components, such as a heatbreak (e.g., a metal tube), a heat sink, a thermistor, and other components. The nozzle 412 typically has a conical shape that tapers down to a predetermined nozzle opening (e.g., 0.4 mm), to thereby precisely guide the melted filament 407 out of the print head 406 and onto the print bed 402 and form the 3d printed object 414. The nozzle 412 can be adjustable and can be many different sizes and shapes, and moreover, can be implemented as a plurality of different types of nozzles 412, depending on various considerations.

The legs 416 support and hold upright the 3D printer hardware 400. The legs 416 are optional and can be many different lengths and shapes. Although the example in FIG. 4 illustrates four legs, it is understood that more or less than four legs can be used.

The 3D printer hardware 400 may further include circuitry 418 and an application 420 stored in the circuitry 418. The application 420 is configured to cooperate and interact with the post-medical procedure therapy device application 324A in the electronic device 302 to 3D print the post-medical-procedure therapy device. The application 420 receives, via the communication channel 520, the finalized design that includes information indicating a type of 3D object to be 3D printed based on a medical image and customized information added to the type of 3D object, and controls the 3D printer hardware 400 to 3D print the post-medical procedure therapy device based on the received design. In some embodiments, it may not be necessary to have separate applications in both the electronic device 302 and the 3D printer hardware 400. For example, according to an alternative exemplary embodiment, the application 324A may be omitted from the electronic device 302, and the user can simply connect his or her phone to the 3D printer hardware 400 and use the application 420 to 3D print the therapy object.

Figure 5:
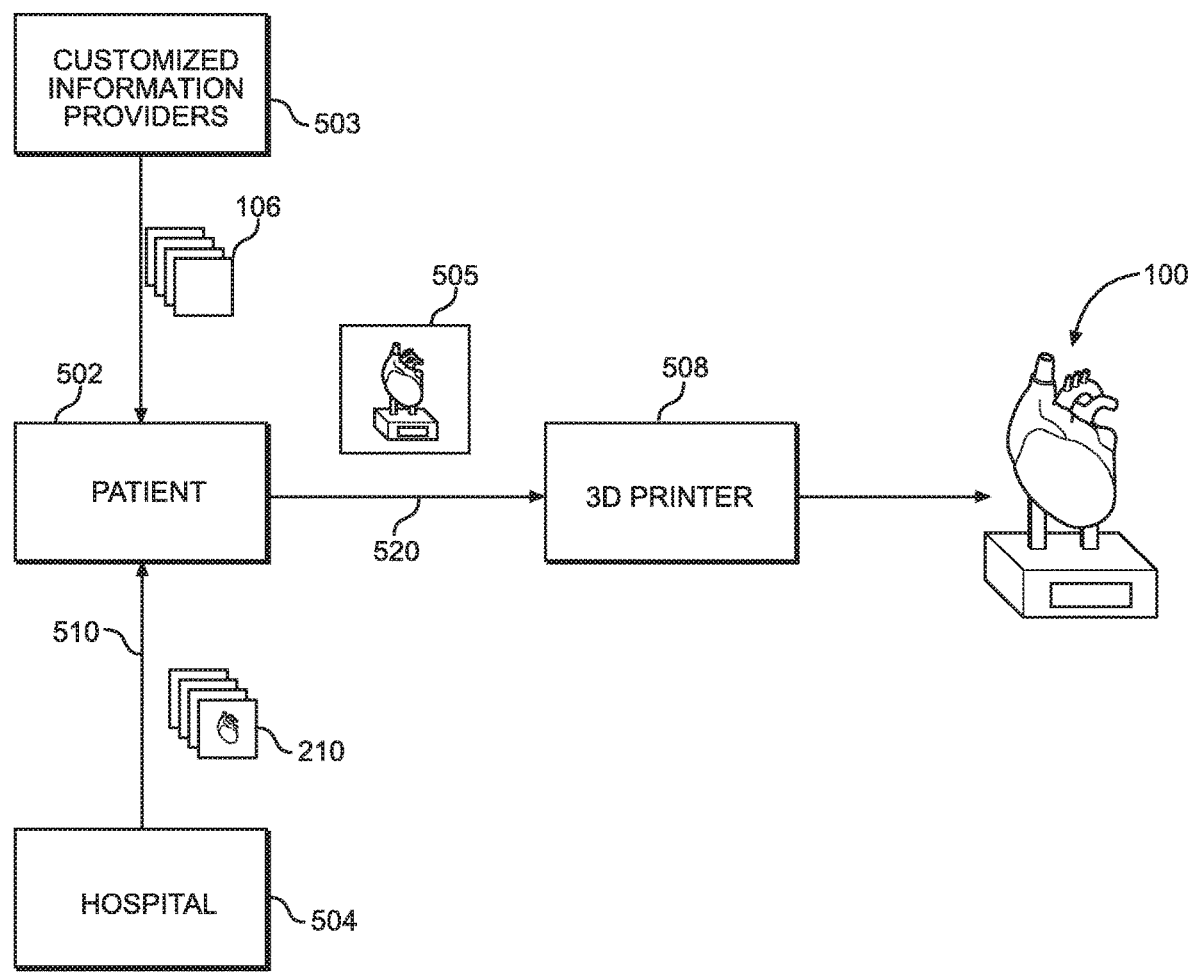
FIG. 5 illustrates a system to fabricate a post-medical procedure therapy device according to an exemplary embodiment.

FIG. 5 illustrates a system to fabricate a post-medical procedure therapy device according to an exemplary embodiment. As shown in FIG. 5, according to an exemplary embodiment, four entities interoperate to fabricate a post-medical procedure therapy device, the four entities including a patient 502, customized information providers 503, a hospital 504, and a 3D printer 508.

The patient 502 is a person who has undergone a medical procedure.

The customized information providers 503 are individuals that provide customized information 106 to the patient 502.

For example, the customized information providers 503 can be family members, friends, or medical staff that provide Get-Well messages or other customized information 106 into the electronic device 302 of the patient 502 while the patient is recovering from the medical procedure. Additionally, in some situations the patient 502 himself or herself may supply the customized information 106 and may not want any customized information from third parties. For example, if the patient 502 wants to design the post-medical procedure therapy device based exclusively on his or her own input, the patient 502 may decide not to obtain any customized information 106 from the customized information providers 502, in which case the patient 502 himself or herself can be considered to be the exclusive provider of the customized information.

The hospital 504 can refer to any facility that includes at least one professional healthcare provider that performs medical procedures according to professional medical standards. Thus, the term "hospital" as used in this context is not limited to any particular size and can refer to a large institution with hundreds of doctors, nurses, and patients, a private medical clinic with several medical professionals, or even a solo medical practitioner such as a licensed doctor, a physician assistant (PA), a registered nurse (RN), etc.

The 3D printer 508 can refer to the physical hardware embodying a 3D printer (e.g., such as the 3D printer 400 shown in FIG. 4), or alternatively can refer to both the 3D printer hardware 400 and a person or people that operate the 3D printer hardware, such as a business entity that runs a 3D printing service. The 3D printer 508 can be controlled by the patient 502 or can be controlled by others.

In practice, the system 500 operates as follows.

First, the hospital 504 obtains at least one medical image 210 of the patient 502. The medical image 210 can be obtained before the medical procedure (e.g., to assist a doctor prepping to perform the procedure), during the medical procedure (e.g., during surgery), and/or after the medical procedure (e.g., to evaluate the results).

Then, after the medical procedure is finished, the hospital transmits the medical image 210 to the patient 502 via a communications channel 510 which can be a telecommunications link (such as email, a secure Web download, some other type of Internet connection, a connection over a fax line, etc.) or a physical delivery channel (such as mailing hard copies of the medical image to the patient 502). The medical image can then be stored in the electronic device 302 as stored medical image 324B.

Then, the patient 502 can obtain customized information (e.g., customized information 106, customized information 110, etc.) from the customized information providers 503. The received customized information can then be stored in the electronic device 302 as stored customized information 324C.

Figure 6:
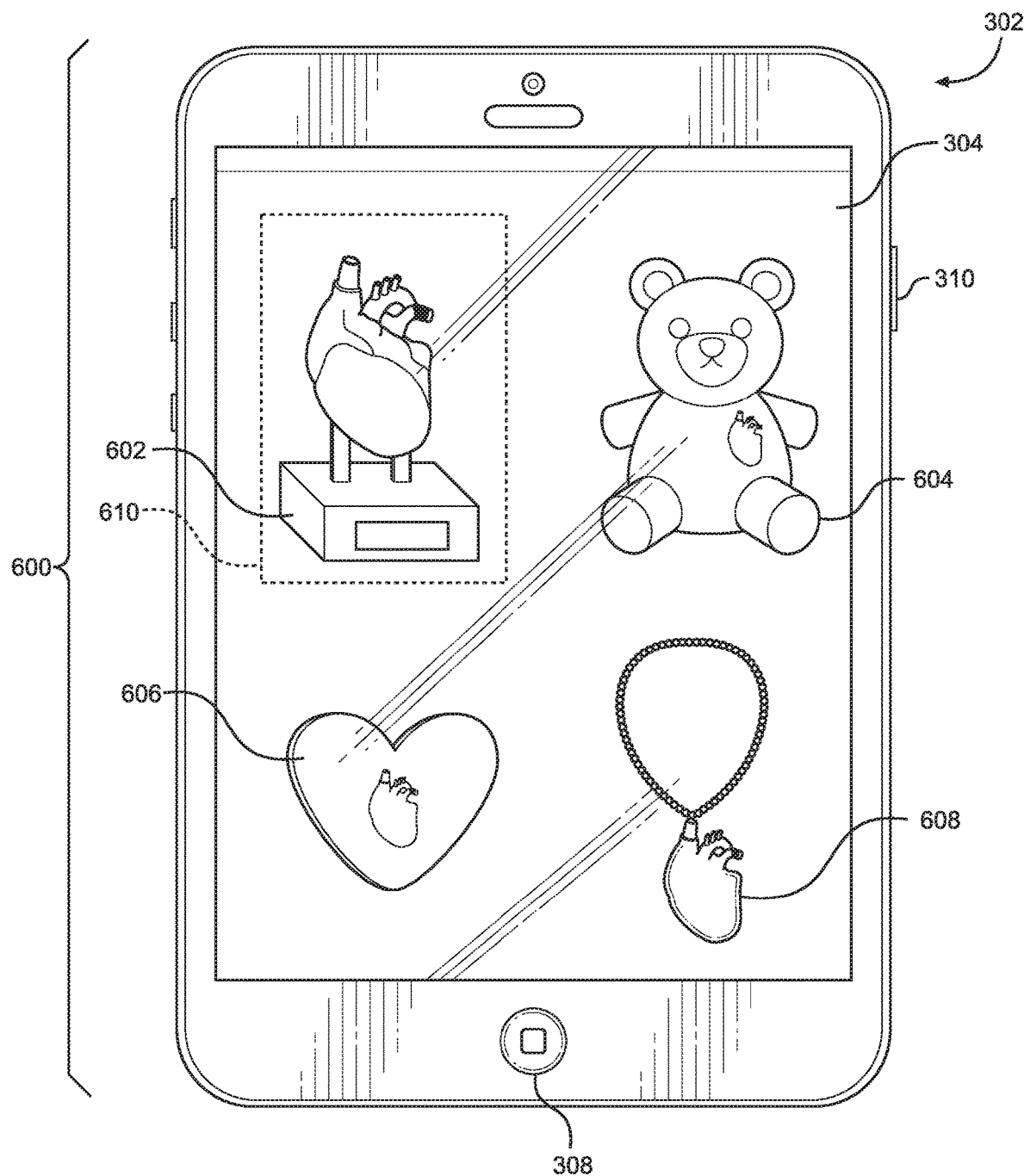
FIG. 6 illustrates a technique of generating initial designs of an object to be 3D printed based on a medical image of a patient, according to an exemplary embodiment.

Then, the patient 502 can select a type of object to be 3D printed based on the patient's medical image. The selection can be made in various ways. For example, as shown in FIG. 6, the selection can be made by providing a user with preview images of a plurality of selectable types of objects 600 to be 3D printed and allowing the user to select one of the types based on the displayed preview images. The preview images are images that show the user a preview of how the 3D printed object will look and may be generated by the post-medical procedure therapy device application 324A accessing the medical images 324B stored in the memory 324 and generating the preview images based on the accessed medical images 324B. For example, as shown in FIG. 6, if the medical image 324B stored in the memory 324 is an image of the patient's heart, the preview images generated and displayed based on the medical image may include a mounted replica 602, a stuffed animal 604, a pillow 606, and jewelry 608. To pick one of the preview images, the user moves a cursor 610 to highlight and select the desired preview image. In the example shown in FIG. 6, the cursor 610 is exemplarily shown as a dotted rectangular box that is highlighting the mounted replica 602. More or less than four preview images may be generated and a variety of display techniques may be used to view all of the preview images. For example, the user may scroll the screen in different directions to see additional preview images, may zoom in or out of a preview image to see additional details, may rotate the preview image, etc. Also, the selectable types are not required to be display as preview images, and may instead be presented in other formats, such as list formats, etc. Once the user decides which preview image he or she prefers, the user can select the preview image and thereby select the initial design of the 3D object to be printed.

Also, it is noted that the types of preview images that are generated and displayed may vary based on the type of medical image being used. For example, certain types of medical images such as X-rays are typically used to obtain two-dimensional images of a body part. Thus, it may be preferable to 3D print a relatively flat type of object, such as a small 3D design to be added to the face of a watch, based on X-ray medical images. In contrast, other types of medical images such as MRIs are typically used to obtain three-dimensional images of a body part. Thus, it may be preferable to 3D print a three-dimensional object having significant depth, such as a 3D replica mounted on a base (see FIG. 1), based on MRI medical images. The post-medical procedure therapy device application 324A can be programmed to adjust the types of preview images generated and displayed based on the type of medical image or based on other factors as well.

Also, instead of generating and displaying a plurality of preview images as shown in FIG. 6, the user may set a default type of 3D object to be 3D printed. For example, if the user only wants to 3D print jewelry, the user may set jewelry as the default type of object to be 3D printed and may omit the operation of generating the preview images shown in FIG. 6. In this case, the initial design of the object to be 3D printed is generated and displayed according to the default instructions.

Figure 7:
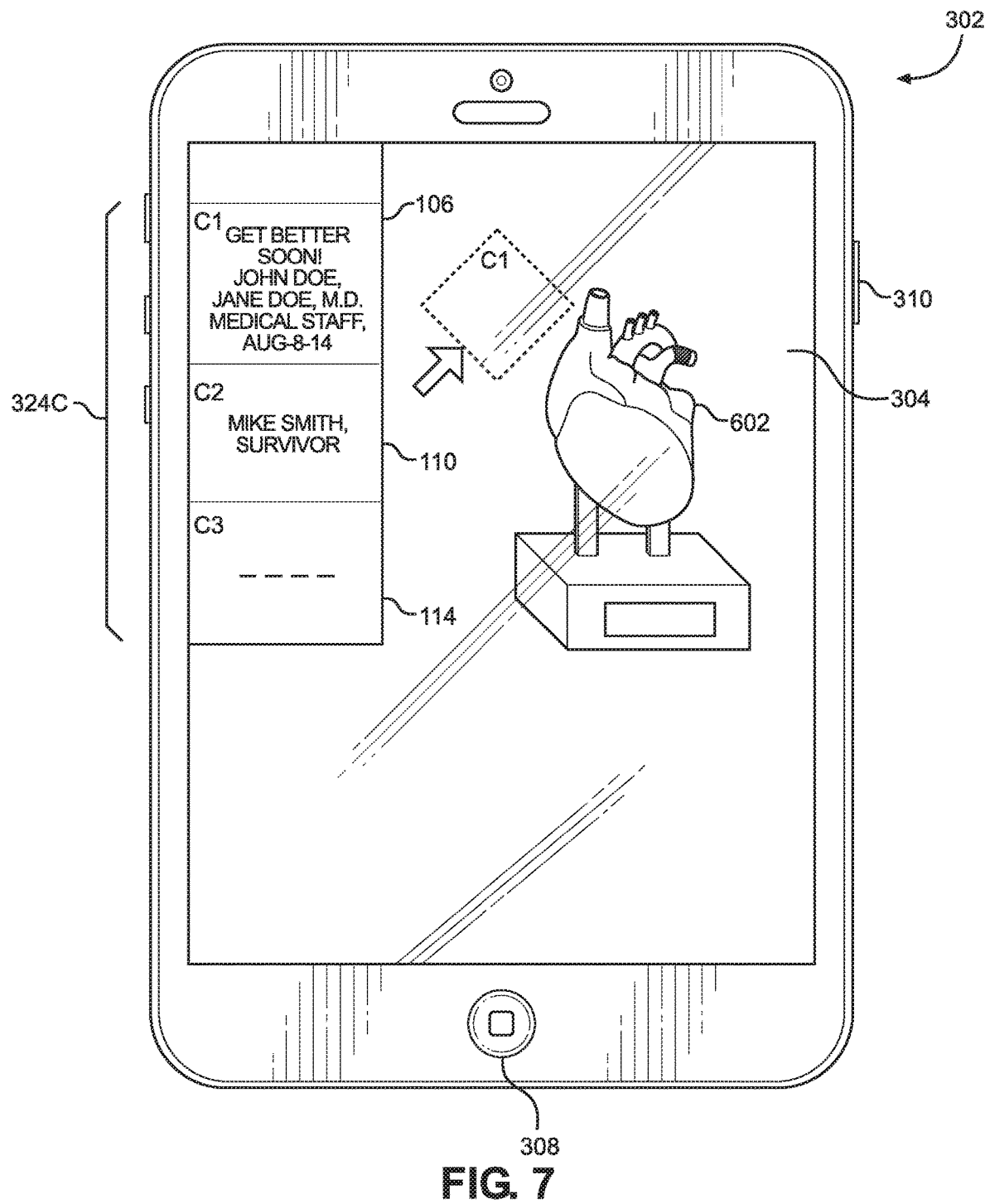
FIG. 7 illustrates a technique of applying customized information to one of the initial designs shown in FIG. 6 to generate a finalized design of an object to be 3D printed, according to an exemplary embodiment.

Then, after selecting the initial design, the patient can add customized information 324C to the initial design to thereby finalize the design of the 3D object. The process of adding customized information to the initial design can be performed in various ways. For example, as shown in FIG. 7, the memory 324 has stored therein the customized information 324C, which can include a plurality of portions of customized information, including a first portion of customized information 106, a second type of customized information 110, a third type of customized information 114, etc. In this example, the first portion of customized information 106 is the Get-Well message (see FIG. 1), the second portion of customized information 110 is the patient's name (see FIG. 1), and the third portion of customized information is blank (unused). The patient 502 can then add the first portion of customized information 106 to a first location on the initial design by pointing, clicking, and dragging the first portion of customized information 106 to a first desired location on the image of the mounted replica 602. The patient 502 can perform this operation by touching the touch screen 304 with a finger or a stylus 306, or using some other technique. The patient 502 can then repeat this process for the other portions of customized information. In this way, the patient 502 can create a finalized design of the 3D object to be printed. Also, it is noted that exemplary embodiments are not limited to the point-click-drag technique shown in FIG. 7, and many other techniques may be used to add the customized information 324C to the initial design, such as typing in coordinates or other location information. Moreover, the post-medical procedure therapy device application 324A may be configured to automatically add the customized information 324C to the initial design. Also, the patient 502 can use various types of graphical software applications to combine the customized information 324C with the medical image 210 and the software applications can be stored on the patient's electronic device 302 or elsewhere, such as a home laptop of the patient 502.

Then, after finalizing the design of the 3D printed object, the patient 502 transmits the finalized design 505 to the 3D printer 508 over a communications channel 520 (e.g., a telecommunications link or a physical delivery channel). The 3D printer 508 then 3D prints the 3D printed object 100 based on the design 505 received from the patient 502.

Figure 8A:
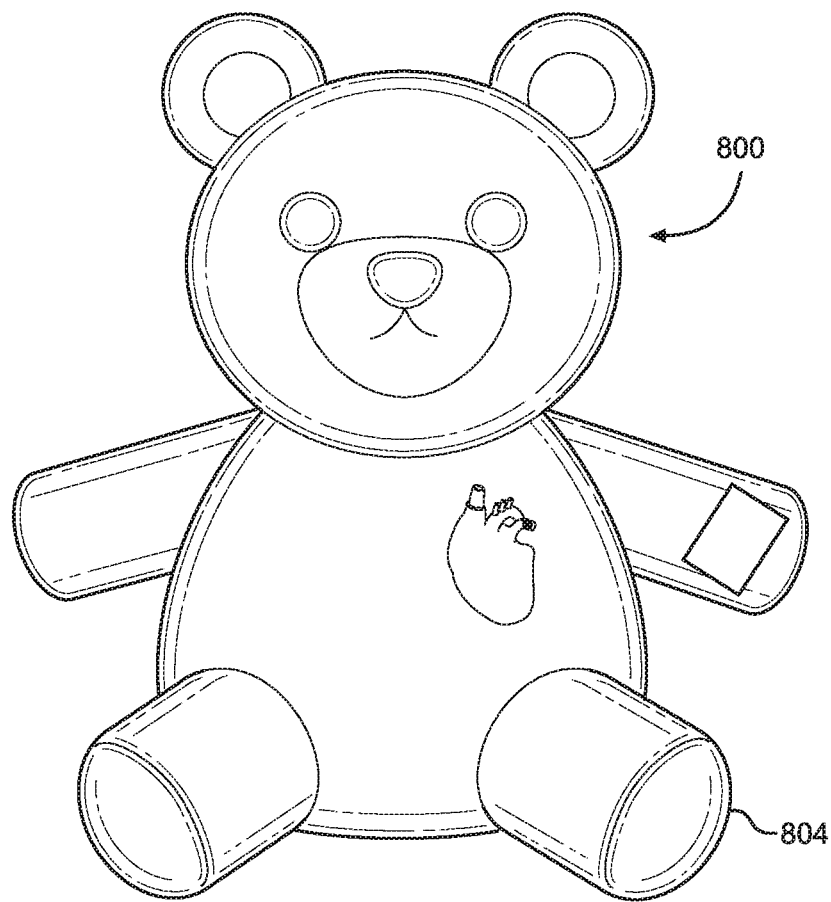
FIGS. 8A and 8B illustrate post-medical procedure therapy devices according to other exemplary embodiments.
Figure 8B:
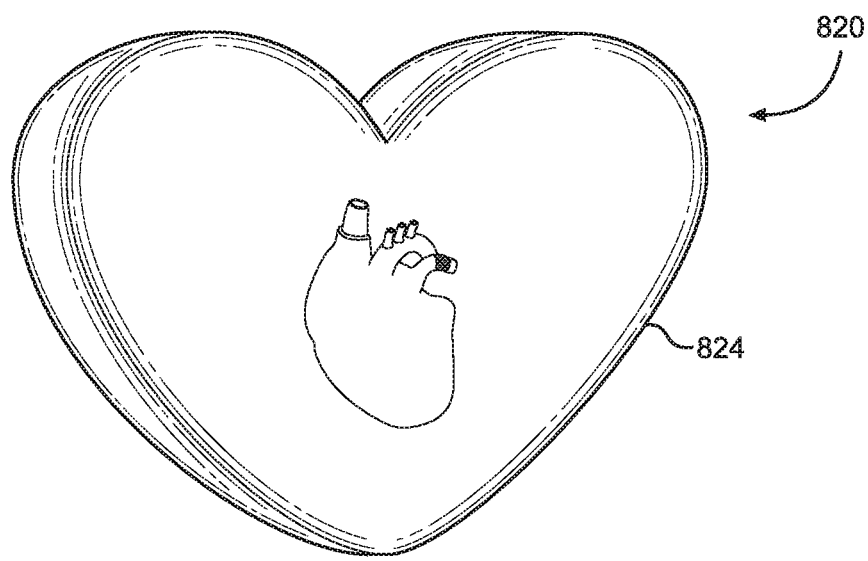

FIGS. 8A and 8B illustrate post-medical procedure therapy devices according to other exemplary embodiments. As shown in FIG. 8A, one type of post-medical procedure therapy device according to other exemplary embodiments is a stuffed animal 800, such as a teddy bear or other animal. The stuffed animal 800 includes a 3D printed object 802 which is manufactured according to the procedure described above with respect to FIGS. 1-7, and further includes a body 804. The 3D printed object 802 can be integrally formed with the body 804, such as when the entire stuffed animal 800 is 3D printed. Alternatively, the 3D printed object 802 and the body 804 can be separately fabricated and then attached together. The 3D printed object 802 and/or the body 804 may be made out of any type of material commonly used to make stuffed animals, such as cotton, etc. The stuffed animal 800 may be particularly useful for children recovering from medical procedures.

As shown in FIG. 8B, another type of post-medical procedure therapy device is a pillow 820. The pillow 820 may be heart shaped or any other shape. The pillow 820 can include a 3D printed object 822 which is manufactured according to the procedure described above with respect to FIGS. 1-7, and further includes a body 804. The 3D printed object 822 can be integrally formed with the body 824, such as when the entire pillow 820 is 3D printed. Alternatively, the 3D printed object 822 and the body 824 can be separately fabricated and then attached together. The 3D printed object 822 and/or the body 824 may be made out of any type of material commonly used to make pillows, such as cotton, silk, goose down, etc. The pillow 820 may be formed in the shape of the body part that is the focus of the medical procedure, such as a heart-shaped pillow for a patient that undergoes heart surgery.

Figure 9A:
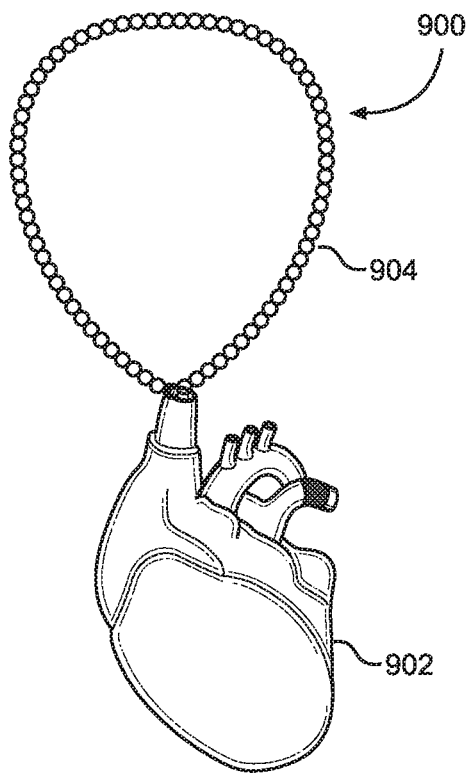
FIGS. 9A, 9B, 9C, and 9D illustrate post-medical procedure therapy devices according to yet other exemplary embodiments.

FIGS. 9A, 9B, 9C, and 9D illustrate post-medical procedure therapy devices according to yet other exemplary embodiments. As shown in FIG. 9A, one type of post-medical procedure therapy device according to yet other exemplary embodiments is jewelry 900, such as a necklace, rings, earring, etc. The jewelry 900 includes a 3D printed object 902 which is manufactured according to the procedure described above with respect to FIGS. 1-7, and further includes a jewelry body 804. The 3D printed object 902 can be integrally formed with the jewelry body 904, such as when the entire piece of jewelry 900 is 3D printed. Alternatively, the 3D printed object 902 and the jewelry body 904 can be separately fabricated and then attached together. The 3D printed object 902 and/or the body 904 may be made out of any type of material commonly used to make jewelry, such as gold, silver, platinum, etc.

Figure 9B:
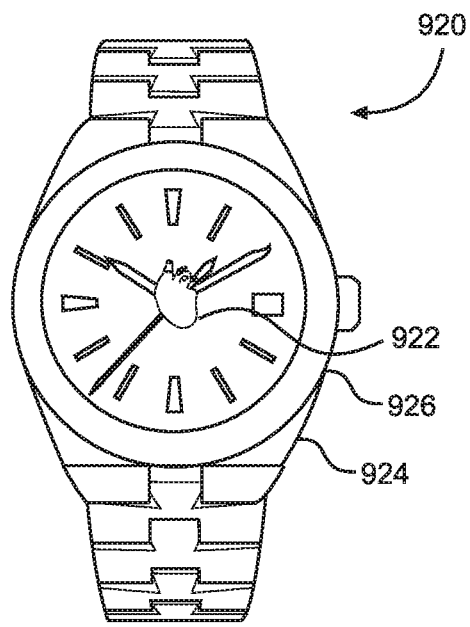

As shown in FIG. 9B, another type of post-medical procedure therapy device according to yet other exemplary embodiments is a traditional watch 920, such as a watch with a minute hand and an hour hand that rotate according to a mechanical or electrical power source. The traditional watch 920 includes a 3D printed object 922 which is manufactured according to the procedure described above with respect to FIGS. 1-7, and further includes a band 924 and a watch face 926. The 3D printed object 922 can be integrally formed on top of the watch face 926, such as when the 3D printed object 922 and watch face 926 are 3D printed together. Alternatively, the 3D printed object 922 and the rest of the watch can be separately fabricated and then attached together. The 3D printed object 922 may be made out of any type of material commonly used to make ornamental watch designs, such as gold, silver, platinum, glass, plastic, etc.

Figure 9C:
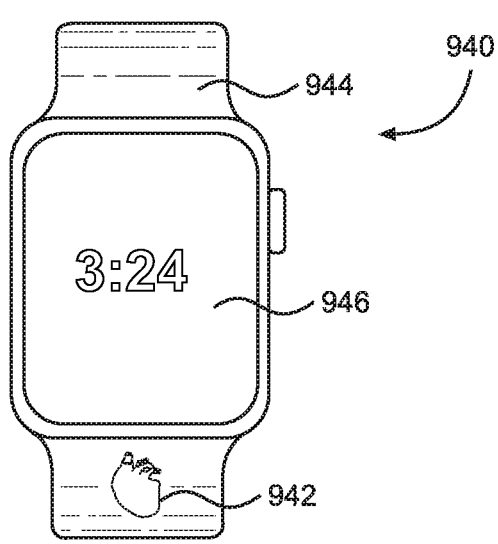

As shown in FIG. 9C, another type of post-medical procedure therapy device according to yet other exemplary embodiments is a smart watch 940, such as an APPLE watch or other type of watch that is configured to transmit and receive telecommunication signals and display digital information to a wearer. The smart watch 940 includes a 3D printed object 942 which is manufactured according to the procedure described above with respect to FIGS. 1-7, and further includes a band 944 and a watch face 946. The 3D printed object 942 can be placed on various places of the smart watch 940, such as the band 944. The 3D printed object 942 may be made out of any type of material commonly used to make ornamental watch designs, such as gold, silver, platinum, glass, plastic, etc.

Figure 9D:
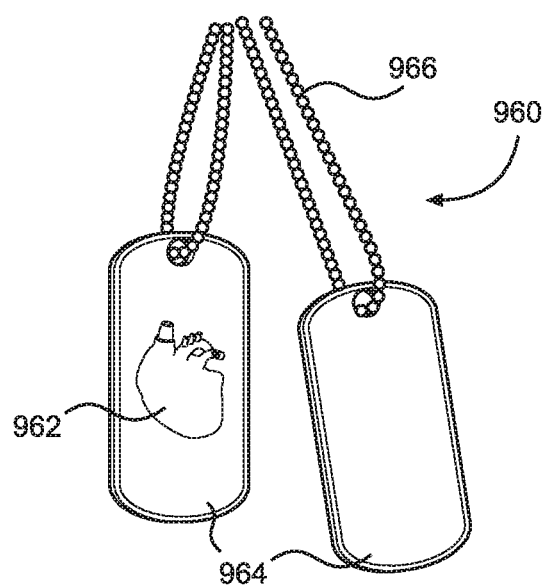

As shown in FIG. 9D, another type of post-medical procedure therapy device according to yet other exemplary embodiments is dog tags 960. The dog tags 960 include a 3D printed object 962 which is manufactured according to the procedure described above with respect to FIGS. 1-7, and further include a tag body 964 and a band 966. The 3D printed object 962 can be integrally formed with the tag body 964, such as when both pieces are 3D printed out of the same piece of metal. Alternatively, the 3D printed object 962 and the body 964 can be separately fabricated and then attached together. The dog tags 960 may be particularly useful for a member of the military that survives a medical procedure.

FIGS. 10A, 10B, and 10C illustrate post-medical procedure therapy devices according to still other exemplary embodiments. As shown in FIG. 10A, one type of post-medical procedure therapy device according to yet other exemplary embodiments is artwork 1000 which can be framed or mounted to a wall. The artwork 1000 includes a 3D printed object 1002 which is manufactured according to the procedure described above with respect to FIGS. 1-7, and further includes a frame 1004, and a fastener 1006 such as a wire, an adhesive, or another device that can support the weight of the frame 1004. In the example shown in FIG. 10, the frame 1004 is a transparent rectangular prism shape, but exemplary embodiments are not limited thereto.

As shown in FIG. 10B, another type of post-medical procedure therapy device according to yet other exemplary embodiments is a coffee mug 1020. The coffee mug 1020 includes a 3D printed object 1022 which is manufactured according to the procedure described above with respect to FIGS. 1-7, and further includes a mug body 1024. The 3D printed object 1022 can be integrally formed with the mug body 1024, such as when both pieces are 3D printed out of ceramic or plastic. Alternatively, the 3D printed object 1022 and the mug body 1024 can be separately fabricated and then attached together.

As shown in FIG. 10C, another type of post-medical procedure therapy device according to yet other exemplary embodiments is a flower vase 1040. The flower vase 1040 includes a 3D printed object 1042 which is manufactured according to the procedure described above with respect to FIGS. 1-7, and further includes a mug body 1024. The 3D printed object 1022 can be integrally formed with the mug body 1024, such as when both pieces are 3D printed out of ceramic or plastic. Alternatively, the 3D printed object 1022 and the mug body 1024 can be separately fabricated and then attached together.

Figure 11A:
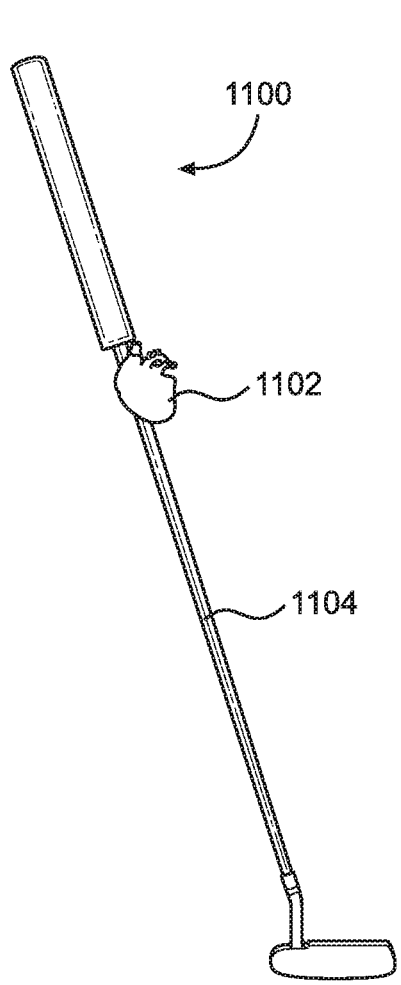
FIGS. 11A, 11B, and 11C illustrate post-medical procedure therapy devices according to yet other exemplary embodiments.
Figure 11B:
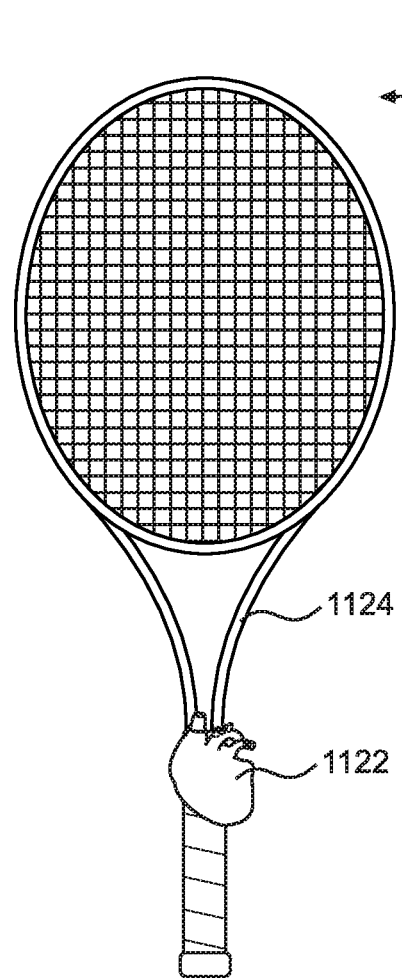
Figure 11C:
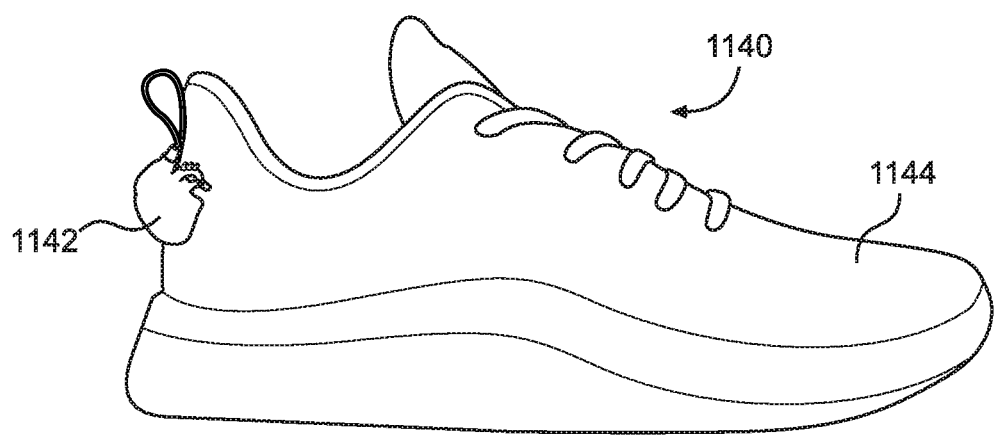

FIGS. 11A, 11B, and 11C illustrate post-medical procedure therapy devices according to yet other exemplary embodiments. As shown in FIG. 11A, one type of post-medical procedure therapy device according to yet other exemplary embodiments is a golf club 1100. The golf club 1100 includes a 3D printed object 1102 which is manufactured according to the procedure described above with respect to FIGS. 1-7, and further includes a golf club body 1104. In the example shown in FIG. 11A, the 3D printed object 1102 is fastened onto the shaft of the golf club body 1104, but exemplary embodiments are not limited thereto. The golf club 1100 may be particularly suitable for avid golfers who recover from medical procedures.

As shown in FIG. 11B, another type of post-medical procedure therapy device according to yet other exemplary embodiments is a tennis racquet 1120. The tennis racquet 1120 includes a 3D printed object 1122 which is manufactured according to the procedure described above with respect to FIGS. 1-7, and further includes a tennis racquet frame 1124. In the example shown in FIG. 11B, the 3D printed object 1102 is fastened onto the shaft of the tennis racquet frame 1124, but exemplary embodiments are not limited thereto. The tennis racquet 1120 may be particularly suitable for avid tennis players who recover from medical procedures.

As shown in FIG. 11C, another type of post-medical procedure therapy device according to yet other exemplary embodiments is a sneaker 1140. The sneaker 1140 includes a 3D printed object 1142 which is manufactured according to the procedure described above with respect to FIGS. 1-7, and further includes a sneaker body 1144. In the example shown in FIG. 11C, the 3D printed object 1102 is fastened onto the heel of the sneaker body 1144, but exemplary embodiments are not limited thereto. The sneaker 1140 may be particularly suitable for individuals who wish to walk and/or run on a regular basis after recovering from a medical procedure.

Figure 12A:
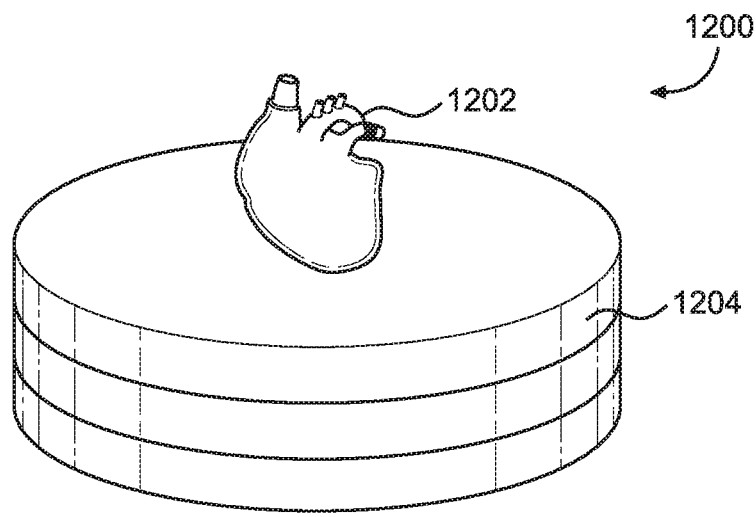
FIGS. 12A and 12B illustrate post-medical procedure therapy devices according to still other exemplary embodiments.

FIG. 12 illustrates post-medical procedure therapy devices according to still other exemplary embodiments. As shown in FIG. 12A, one type of post-medical procedure therapy device according to still other exemplary embodiments is a 3D printed edible product 1200. In the example shown in FIG. 12A, the 3D printed edible product 1200 is a cake. The 3D printed edible product 1200 includes a 3D printed object 1202 which is manufactured according to the procedure described above with respect to FIGS. 1-7, and further includes an edible cake body 1204. The 3D printed object 1202 is manufactured using edible material such as cake batter as a filament for the 3D printer, and then placed on top of the edible body 1204.

Figure 12B:
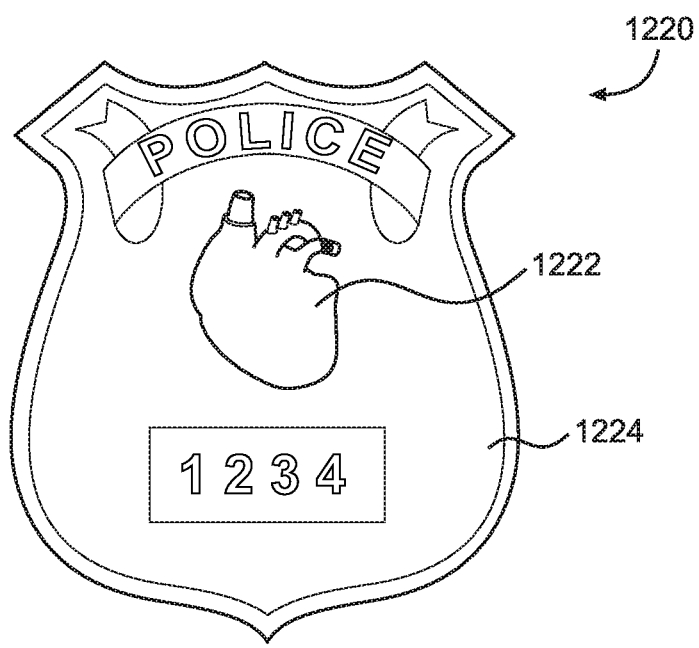

As shown in FIG. 12B, another type of post-medical procedure therapy device according to still other exemplary embodiments is a law enforcement object 1220. In the example shown in FIG. 12B, the law enforcement object 1220 is a police badge, but exemplary embodiments are not limited thereto. The law enforcement object 1220 includes a 3D printed object 1222 which is manufactured according to the procedure described above with respect to FIGS. 1-7, and further includes a law enforcement object body 1224. The 3D printed object 1222 can be integrally formed with the law enforcement object body 1224, such as when both pieces are 3D printed out of the same piece of metal, or can be separately formed. The law enforcement object 1220 may be particularly suitable for a member of the military or a member of law enforcement that survives a medical procedure, such as a procedure resulting from an injury obtained on a tour of duty. Although FIG. 13 exemplarily illustrates the law enforcement object 1220 as a police badge, exemplary embodiments are not limited thereto. For example, the law enforcement object 1220 may alternatively be implemented as various types of police or military clothing (e.g., uniforms, police caps, boots, etc.), various types of defensive objects used to defend against attacks (e.g., riot shields, bulletproof vests, helmets, etc.), various types of weapons, or other objects that may have sentimental value to the person injured in the line of duty.

In each of the examples shown in FIGS. 8A-12B, the 3D printed object is exemplarily shown as a replica of a patient's heart, but exemplary embodiments are not limited to any particular body part. Many different part of a patient's body can be fabricated using 3D printing, including bones, skin, organs, tissues, etc., and can be applied to the exemplary embodiments described above.

Figure 13:
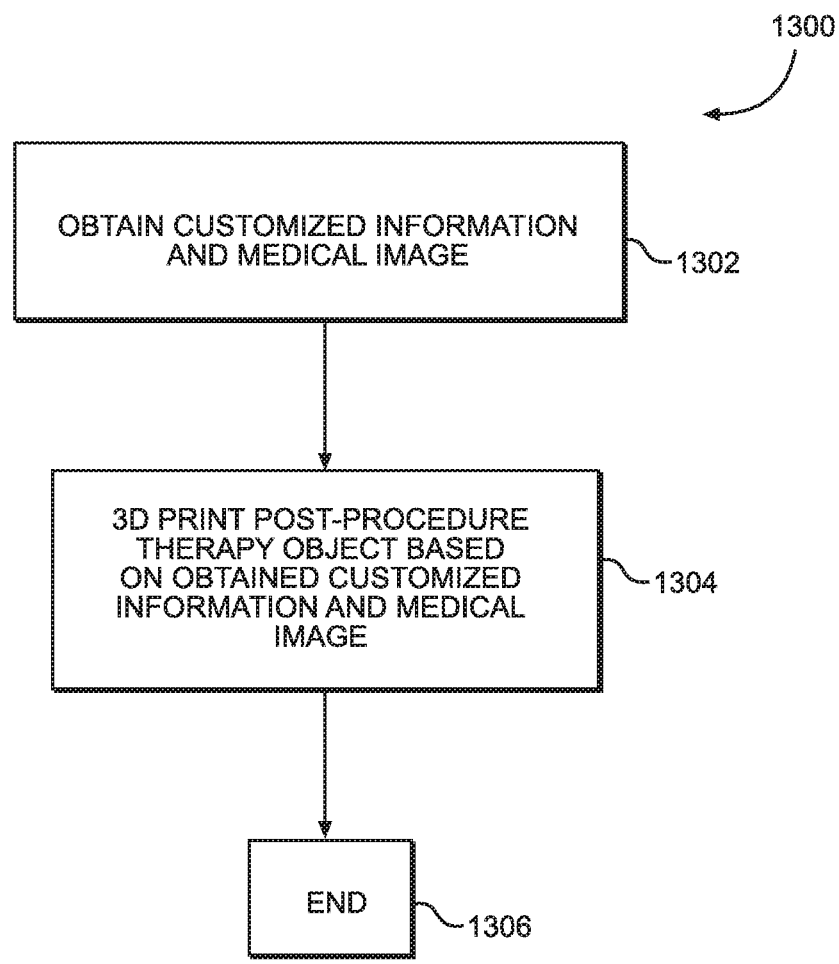
FIG. 13 illustrates a method of generating a post-medical procedure therapy device, according to an exemplary embodiment.

FIG. 13 illustrates a method of generating a post-medical procedure therapy device, according to an exemplary embodiment. In the below description of method 1300, it is assumed for exemplary purposes that the method 1300 is performed by the 3D printer 508. However, the method 1300 is not limited to being performed by a combination of the patient 502 and the 3D printer 508, or some other entity or combination of entities.

In operation 1302, the 3D printer 508 obtains customized information and at least one medical image.

In operation 1304, the 3D printer 508 3D prints a post-medical procedure therapy object based on the obtained customized information and the obtained medical image.

In operation 1306, the method ends.

Figure 14:
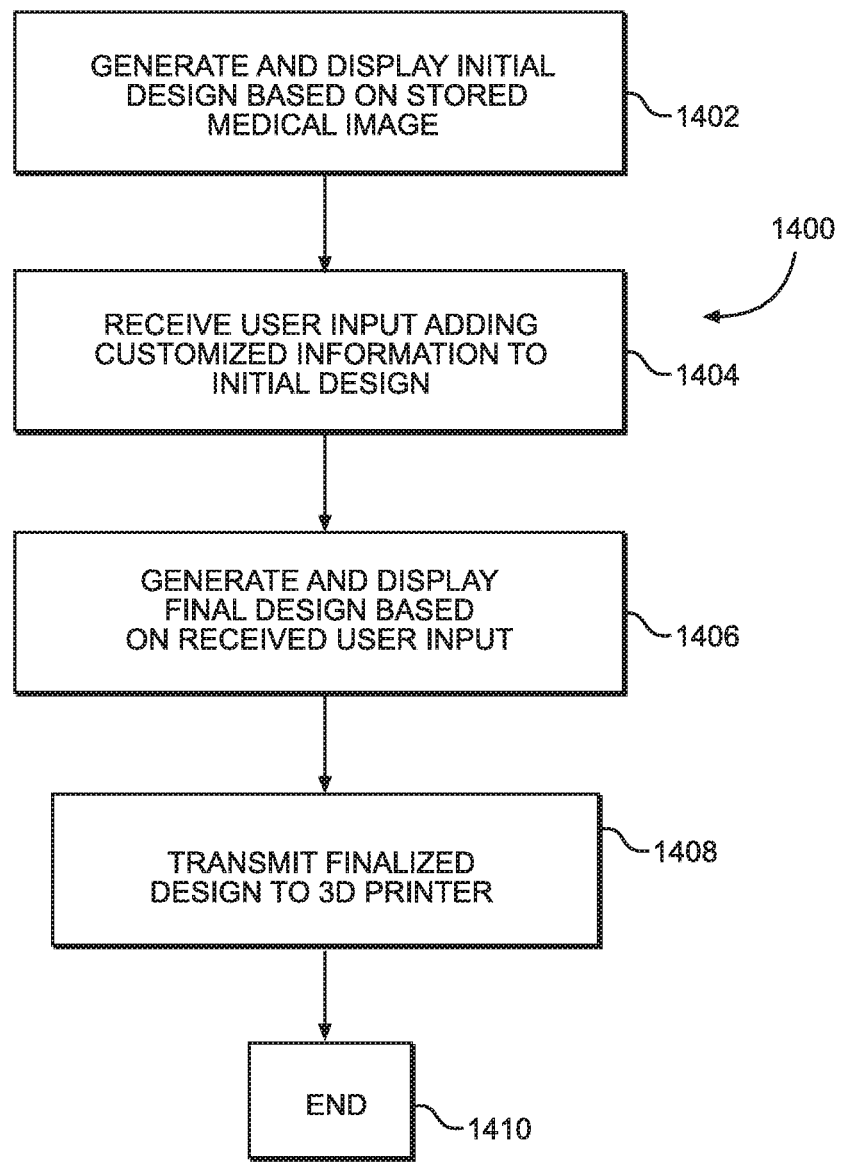
FIG. 14 illustrates a method of generating a finalized design of an object to be 3D printed, according to an exemplary embodiment.

FIG. 14 illustrates a method of generating a finalized design of an object to be 3D printed, according to an exemplary embodiment. In the below description of the method 1400, it is assumed for exemplary purposes that the method 1400 is performed by the post-medical procedure therapy device application 324A stored in the memory 324 of the electronic device 302. However, the method 1400 is not limited thereto, and can instead be performed by other applications, other software and/or hardware devices, etc.

In operation 1402, the post-medical procedure therapy device application 324A generates and displays an initial design based on a stored medical image. For example, the post-medical procedure therapy device application 324A may access a medical image 324B stored in the memory 324, and may generate and display an initial design based on the accessed medical image 324B.

In operation 1404, the post-medical procedure therapy device application 324A receives user input adding customized information to the initial design. For example, the post-medical procedure therapy device application 324A may receive the user input when the user adds customized information using the technique shown and described in connection with FIG. 7.

In operation 1406, the post-medical procedure therapy device application 324A generates and displays a finalized design based on the user input received in operation 1404.

In operation 1408, the post-medical procedure therapy device application 324A causes the electronic device 302 to transmit the finalized design to a 3D printer to be 3D printed. For example, the post-medical procedure therapy device application 324A may send a message to the CPU 342 indicating that the design has been finalized, and the CPU 342 may then control the network communication circuitry 322 to cause the finalized design to be transmitted over the communication channel 520 to the 3D printer 508. Additionally, according to some exemplary embodiments, the post-medical procedure therapy device application 324A may directly control the 3D printer 508 and thereby cause the 3D printer 508 to perform the physical 3D printing operations.

In operation 1410, the method 1400 ends.

Figure 15:
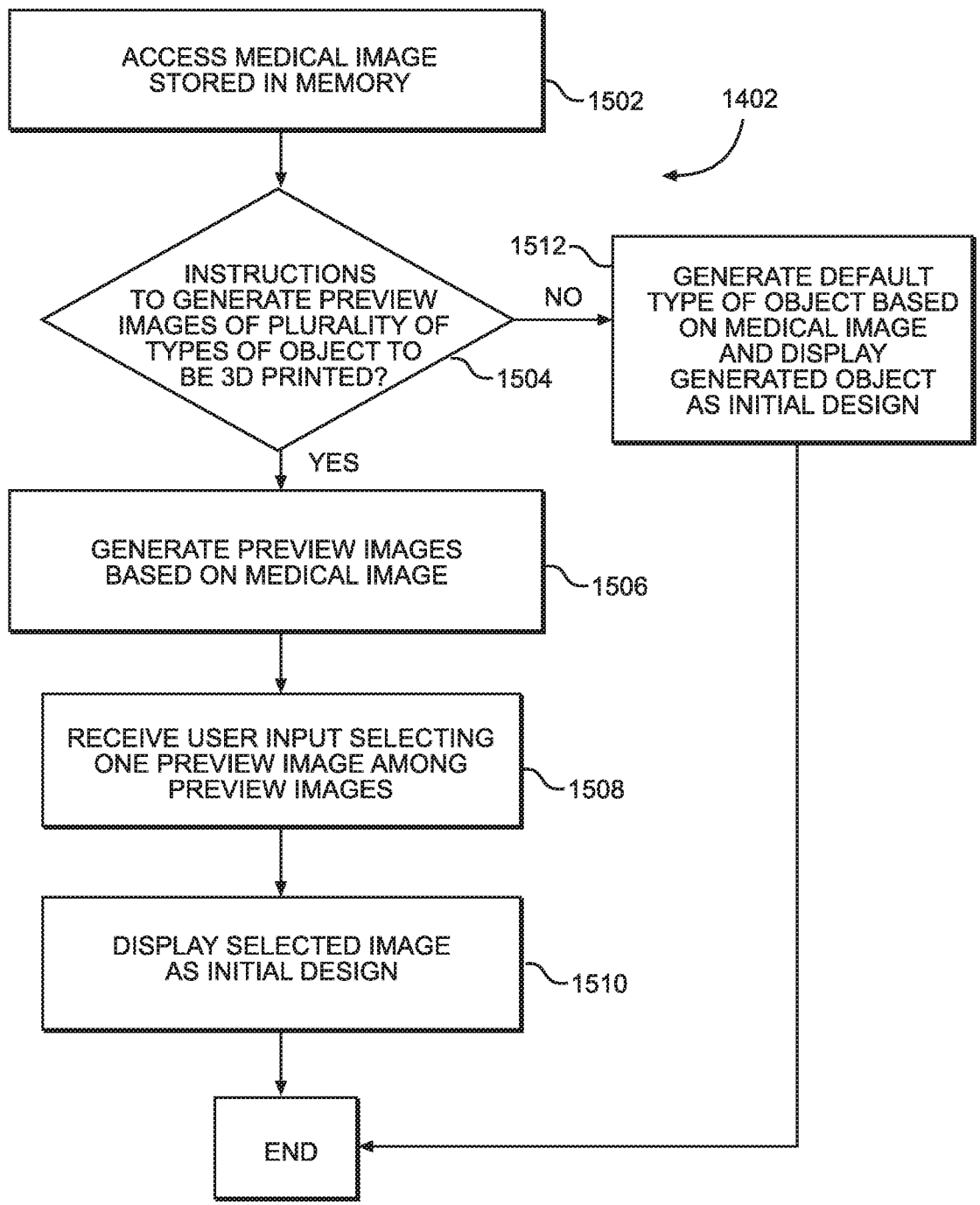
FIG. 15 illustrates a detailed view of the operation of generating and displaying an initial design, according to an exemplary embodiment.

FIG. 15 illustrates a detailed view of the operation of generating and displaying an initial design (operation 1402 in FIG. 14), according to an exemplary embodiment.

In operation 1502, the post-medical procedure therapy device application 324A accesses a medical image stored in a memory. For example, the post-medical procedure therapy device application 324A may access the medical image 324B stored in the memory 324.

In operation 1504, the post-medical procedure therapy device application 324A determines whether there are instructions to generate preview images of a plurality of types of objects to be 3D printed. The instructions may be stored in advance in the memory 324. Alternatively, the instructions may be contemporaneously input by a user during the process of designing the 3D object. For example, the touch screen 304 may display a prompt asking the user whether the user would like preview images to be generated, and if the user selects "yes", the post-medical procedure therapy device application 324A will determine in operation 1504 that instructions to generate the preview images are present.

If the post-medical procedure therapy device application 324A determines in operation 1504 that the instructions to generate preview images are present ("YES"), then, in operation 1506, the post-medical procedure therapy device application 324A generates the preview images based on the medical image. For example, the post-medical procedure therapy device application 324A may generate the preview images using the technique described in connection with FIG. 6. Then, in operation 1508, the post-medical procedure therapy device application 324A receives user input selecting one of the preview images from among the plurality of preview images, and in operation 1510, the post-medical procedure therapy device application 324A displays the selected preview image as the initial design.

Alternatively, if the post-medical procedure therapy device application 324A determines in operation 1504 that the instructions to generate preview images are not present ("NO"), then, in operation 1512, the post-medical procedure therapy device application 324A generates a default type of object based on the medical image and displays the generated object as the initial design.

Figure 16:
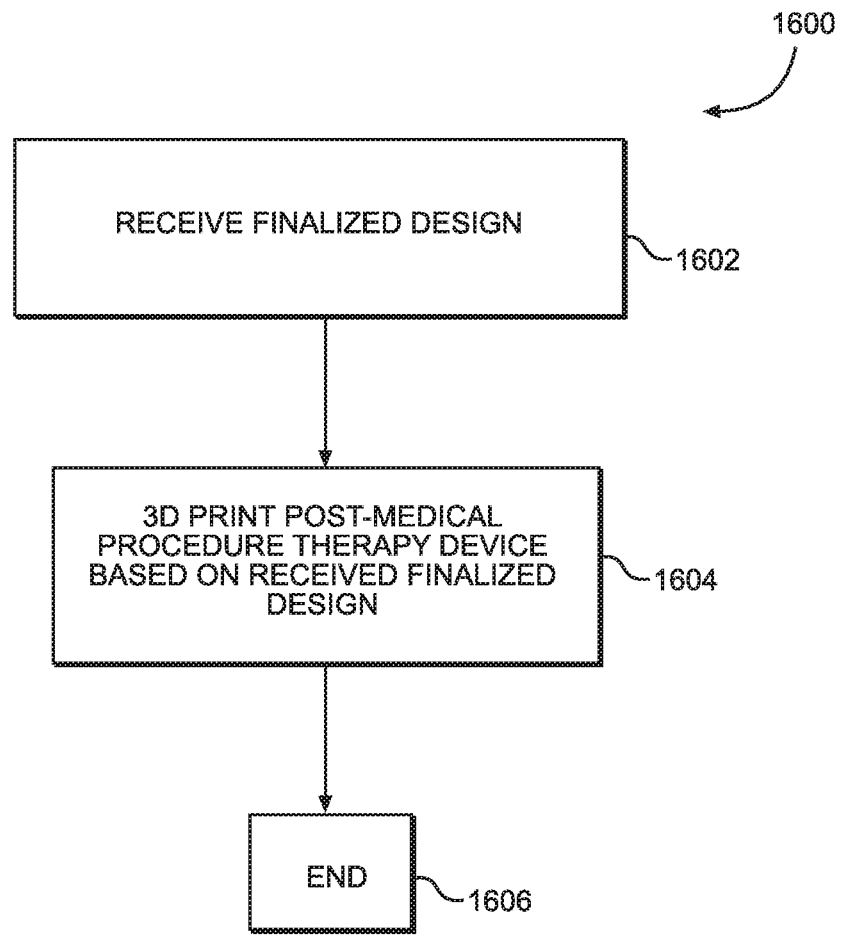
FIG. 16 illustrates a method of receiving a finalized design and 3D printing a post-medical procedure therapy device based on the received design, according to an exemplary embodiment.

FIG. 16 illustrates a method of receiving a finalized design and 3D printing a post-medical procedure therapy device based on the received design, according to an exemplary embodiment. In the below description of method 1600, it is assumed for exemplary purposes that the method 1600 is performed by the 3D printer 508. However, the method 1300 is not limited to being performed by the 3D printer 508, and can instead be performed by other entities.

In operation 1602, the 3D printer 508 receives the finalized design. For example, the 3D printer 508 may receive the finalized design that is transmitted from the patient 502 over the communications channel 520, after the patient 502 generates the finalized design using the technique shown in FIGS. 14 and 15.

In operation 1604, the 3D printer 3D prints a post-medical procedure therapy device based on the finalized design received in operation 1602.

In operation 1606, the method ends.

Aspects of the exemplary embodiments may also be embodied in a non-transitory computer readable storage medium, such as a memory device. For example, the post-medical procedure therapy device application 324A may be implemented in a non-transitory computer readable storage medium, such as RAM, SRAM, DRAM, PROM, EPROM, EEPROM, flash memory, on-chip memory, ROM, optical disc drives, cloud-based storage, and other types of non-transitory storage media. In this case, when the CPU 342 executes the functionality of the post-medical procedure therapy device application 324A, the result is that the post-medical procedure therapy device application 324A controls the electronic device 302 and/or the 3D printer hardware 400 to 3D print a post-medical procedure therapy device, as described above with respect to the various exemplary embodiments.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments. For example, components of the electronic device 302 may be physically mounted on the 3D printer hardware 400, or there may be multiple different electronic devices 302 communicating with each other to arrive at the finalized design. Additionally, the post-medical procedure therapy device application 324A is not limited to being stored on the patient's electronic device 302, and instead may be stored in the 3D printer hardware 400, may be cloud-based, or may be stored on some other device altogether.

While one or more exemplary embodiments have been described with reference to the figures, it will be understood by those of ordinary skill in the art that various changes in form and details may be made therein without departing from the spirit and scope as defined by the following claims.

What is claimed is:

1. A post-medical-procedure therapy device, comprising:
   a body part replica that is a replica of a body part that has undergone a medical procedure, and the body part replica shows the body part after the medical procedure; and
   customized information provided on the body part replica;
   wherein both the body part replica and the customized information are 3D printed; and
   wherein the customized information comprises a get-well message provided to the patient after a medical procedure,
   wherein the body part replica further comprises a procedure focus area which corresponds to a portion of the body part on which the medical procedure was performed, the procedure focus area comprising a 3D replica of a medical treatment device inserted into or applied on the body part to successfully preform the medical procedure and treat the body part; and
   wherein the 3D replica of the medical treatment device is generated based on a comparison of medical images of the body part taken before and after the medical procedure is performed and highlights the medical procedure.

2. The post-medical-procedure therapy device according to claim 1, further comprising:
   a base to support the body part replica,
   wherein additional customized information is provided on the base.

3. The post-medical-procedure therapy device according to claim 2, wherein the body part replica is 3D printed based on a medical image of the body part of the patient.

4. The post-medical-procedure therapy device according to claim 3, wherein the customized information is 3D printed based on the at least one handwritten message which is input to an electronic device of the patient.

5. The post-medical-procedure therapy device according to claim 4, wherein the customized information and the body part replica are 3D printed from a same material such that the customized information and the body part replica are integrally formed.

6. The post-medical-procedure therapy device according to claim 5, wherein the post-medical-procedure therapy device is 3D printed as one of a stuffed animal, a pillow, jewelry, a watch, dog tags, artwork, a coffee mug, a vase, sporting equipment, an edible product, or a law enforcement object.

7. The post-medical-procedure therapy device according to claim 1, wherein the 3D replica of the medical treatment device comprises a 3D replica of a graft.

* * * * *